(12) United States Patent
Becker

(10) Patent No.: US 10,417,935 B2
(45) Date of Patent: *Sep. 17, 2019

(54) SYSTEM AND DEVICE FOR WELDING TRAINING

(71) Applicant: ILLINOIS TOOL WORKS INC., Glenview, IL (US)

(72) Inventor: William J. Becker, Manitowoc, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/425,594

(22) Filed: Feb. 6, 2017

(65) Prior Publication Data

US 2017/0148352 A1 May 25, 2017

Related U.S. Application Data

(63) Continuation of application No. 13/799,390, filed on Mar. 13, 2013, now Pat. No. 9,583,014.
(Continued)

(51) Int. Cl.
*G09B 19/24* (2006.01)
*G09B 5/00* (2006.01)
(Continued)

(52) U.S. Cl.
CPC .............. *G09B 19/24* (2013.01); *B23K 9/095* (2013.01); *B23K 9/0956* (2013.01); *B23K 9/16* (2013.01);
(Continued)

(58) Field of Classification Search
CPC ..... B23K 11/253; B23K 11/252; B23K 11/25; B23K 20/123; B23K 9/0953;
(Continued)

(56) References Cited

U.S. PATENT DOCUMENTS 1,340,270 A 5/1920 Emil
2,045,800 A 6/1936 Walther
(Continued)

FOREIGN PATENT DOCUMENTS

CA 2311685 12/2001
CA 2517874 12/2001
(Continued)

OTHER PUBLICATIONS

"Low Cost Virtual Reality Welding Training System," NSRP Joint Panel Meeting, Apr. 21, 2010, http://www.nsrp.org/6-Presentations/Joint/042110_Low_Cost_Virtual_Reality_Welder_Training_System_Fast.pdf.
(Continued)

*Primary Examiner* — Jerry-Daryl Fletcher
(74) *Attorney, Agent, or Firm* — McAndrews, Held & Malloy, Ltd.

(57) ABSTRACT

A system and device for welding training. In one example, a welding training system includes a position detecting system configured to detect a distance between the position detecting system and objects within a field of view of the position detecting system, and to produce a map corresponding to the objects. The welding training system also includes a markers configured to be coupled to a device of the welding training system. Furthermore, the markers are configured to be detected by the position detecting system.

19 Claims, 6 Drawing Sheets

Related U.S. Application Data

(60) Provisional application No. 61/724,322, filed on Nov. 9, 2012.

(51) Int. Cl.
  *B23K 9/095* (2006.01)
  *B23K 9/16* (2006.01)
  *B23K 9/32* (2006.01)
  *G09B 9/00* (2006.01)

(52) U.S. Cl.
  CPC ............... *B23K 9/32* (2013.01); *G09B 5/00* (2013.01); *G09B 9/00* (2013.01)

(58) Field of Classification Search
  CPC ........ B23K 9/0956; G05B 2219/39021; G05B 2219/39026; G05B 2219/39024; G09B 25/02; G09B 19/24; G09B 9/00
  See application file for complete search history.

(56) References Cited

U.S. PATENT DOCUMENTS

| | | |
|---|---|---|
| 2,045,801 A | 6/1936 | Richter |
| 2,045,802 A | 6/1936 | Walther |
| 2,333,192 A | 10/1942 | Moberg |
| 2,351,910 A | 6/1944 | Blankenbuehler |
| 3,391,691 A | 7/1968 | Young |
| 3,679,865 A | 7/1972 | Jesnitzer |
| 3,867,769 A | 2/1975 | Schow |
| 4,028,522 A | 6/1977 | Chihoski |
| 4,041,615 A | 8/1977 | Whitehill |
| 4,044,377 A | 8/1977 | Bowerman |
| 4,124,944 A | 11/1978 | Blair |
| 4,132,014 A | 1/1979 | Schow |
| 4,144,766 A | 3/1979 | Wehrmeister |
| 4,224,501 A | 9/1980 | Lindbom |
| 4,253,648 A | 3/1981 | Meeks |
| 4,294,440 A | 10/1981 | Severt |
| 4,375,026 A | 2/1983 | Kearney |
| 4,375,165 A | 3/1983 | deSterke |
| 4,389,561 A | 6/1983 | Weman |
| 4,396,945 A | 8/1983 | DiMatteo |
| 4,412,121 A | 10/1983 | Kremers |
| 4,452,589 A | 6/1984 | Denison |
| 4,459,114 A | 7/1984 | Barwick |
| 4,471,207 A | 9/1984 | Hawkes |
| 4,484,059 A | 11/1984 | Lillquist |
| 4,518,361 A | 5/1985 | Conway |
| 4,541,055 A | 9/1985 | Wolfe |
| 4,555,614 A | 11/1985 | Morris |
| 4,557,191 A | 12/1985 | Speicher |
| 4,577,499 A | 3/1986 | Silke |
| 4,590,356 A | 5/1986 | Povlick |
| 4,591,689 A | 5/1986 | Brown |
| 4,594,497 A | 6/1986 | Takahashi |
| 4,595,186 A | 6/1986 | Reed |
| 4,595,368 A | 6/1986 | Cole |
| 4,595,820 A | 6/1986 | Richardson |
| 4,609,806 A | 9/1986 | Grabkowski |
| 4,628,176 A | 12/1986 | Kojima |
| 4,638,146 A | 1/1987 | Koyama |
| 4,641,292 A | 2/1987 | Tunnell |
| 4,677,277 A | 6/1987 | Cook |
| 4,680,014 A | 7/1987 | Paton |
| 4,689,021 A | 8/1987 | Vasiliev |
| 4,716,273 A | 12/1987 | Paton |
| 4,721,947 A | 1/1988 | Brown |
| 4,728,768 A | 3/1988 | Cueman |
| 4,739,404 A | 4/1988 | Richardson |
| 4,767,109 A | 8/1988 | Raketich |
| 4,820,901 A | 4/1989 | Peviani |
| 4,829,365 A | 5/1989 | Eichenlaub |
| 4,830,261 A | 5/1989 | Mello |
| 4,867,685 A | 9/1989 | Brush |
| 4,868,649 A | 9/1989 | Gaudin |
| 4,877,940 A | 10/1989 | Bangs |
| 4,881,678 A | 11/1989 | Gaudin |
| 4,920,249 A | 4/1990 | McLaughlin |
| 4,931,018 A | 6/1990 | Herbst |
| 4,937,427 A | 6/1990 | McVicker |
| 4,943,702 A | 7/1990 | Richardson |
| 4,954,690 A | 9/1990 | Kensrue |
| 4,992,881 A | 2/1991 | Tomasek |
| 4,996,409 A | 2/1991 | Paton |
| 5,061,841 A | 10/1991 | Richardson |
| 5,103,376 A | 4/1992 | Blonder |
| 5,185,561 A | 2/1993 | Good |
| 5,208,436 A | 5/1993 | Blankenship |
| 5,211,564 A | 8/1993 | Martinez |
| 5,231,928 A | 8/1993 | Phillips |
| 5,243,265 A | 9/1993 | Matsuura |
| 5,281,921 A | 1/1994 | Novak |
| 5,283,418 A | 2/1994 | Bellows |
| 5,302,799 A | 4/1994 | Kennedy |
| 5,304,774 A | 4/1994 | Durheim |
| 5,306,893 A | 4/1994 | Morris |
| 5,320,538 A | 6/1994 | Baum |
| 5,343,011 A | 8/1994 | Fujii |
| 5,380,978 A | 1/1995 | Pryor |
| 5,397,872 A | 3/1995 | Baker |
| 5,404,181 A | 4/1995 | Hung |
| 5,426,732 A | 6/1995 | Boies |
| 5,430,643 A | 7/1995 | Seraji |
| 5,448,405 A | 9/1995 | Clausen |
| 5,464,957 A | 11/1995 | Kidwell |
| 5,508,757 A | 4/1996 | Chen |
| 5,514,846 A | 5/1996 | Cecil |
| 5,517,420 A | 5/1996 | Kinsman |
| 5,521,843 A | 5/1996 | Hashima |
| 5,533,146 A | 7/1996 | Iwai |
| 5,543,863 A | 8/1996 | Lin |
| 5,546,476 A | 8/1996 | Mitaka |
| 5,571,431 A | 11/1996 | Lantieri |
| 5,592,241 A | 1/1997 | Kita |
| 5,617,335 A | 4/1997 | Hashima |
| 5,659,479 A | 8/1997 | Duley |
| 5,668,612 A | 9/1997 | Hung |
| 5,674,415 A | 10/1997 | Leong |
| 5,675,229 A | 10/1997 | Thorne |
| 5,681,490 A | 10/1997 | Chang |
| 5,708,253 A | 1/1998 | Bloch |
| 5,709,219 A | 1/1998 | Chen |
| 5,747,042 A | 5/1998 | Choquet |
| 5,823,785 A | 10/1998 | Matherne, Jr. |
| 5,832,139 A | 11/1998 | Batterman |
| 5,845,053 A | 12/1998 | Watanabe |
| 5,856,844 A | 1/1999 | Batterman |
| 5,930,093 A | 7/1999 | Morrissett |
| 5,961,859 A | 10/1999 | Chou |
| 5,973,677 A | 10/1999 | Gibbons |
| 5,999,909 A | 12/1999 | Rakshit |
| 6,003,052 A | 12/1999 | Yamagata |
| 6,018,729 A | 1/2000 | Zacharia |
| 6,019,359 A | 2/2000 | Fly |
| 6,024,273 A | 2/2000 | Ludewig |
| 6,033,226 A | 3/2000 | Bullen |
| 6,039,494 A | 3/2000 | Pearce |
| 6,046,431 A | 4/2000 | Beattie |
| 6,046,754 A | 4/2000 | Stanek |
| 6,049,059 A | 4/2000 | Kim |
| 6,051,805 A | 4/2000 | Vaidya |
| 6,101,455 A | 8/2000 | Davis |
| 6,107,601 A | 8/2000 | Shimogama |
| 6,115,025 A | 9/2000 | Buxton |
| 6,130,407 A | 10/2000 | Villafuerte |
| 6,136,946 A | 10/2000 | Yao |
| 6,153,848 A | 11/2000 | Nagae |
| 6,155,475 A | 12/2000 | Ekelof |
| 6,163,946 A | 12/2000 | Pryor |
| 6,226,395 B1 | 5/2001 | Gilliland |
| 6,236,017 B1 | 5/2001 | Smartt |
| 6,242,711 B1 | 6/2001 | Cooper |
| 6,271,500 B1 | 8/2001 | Hirayama |

(56) References Cited

U.S. PATENT DOCUMENTS

| | | |
|---|---|---|
| 6,288,359 B1 | 9/2001 | Koch |
| 6,290,740 B1 | 9/2001 | Schaefer |
| 6,301,763 B1 | 10/2001 | Pryor |
| 6,315,186 B1 | 11/2001 | Friedl |
| 6,329,635 B1 | 12/2001 | Leong |
| 6,337,458 B1 | 1/2002 | Lepeltier |
| 6,371,765 B1 | 4/2002 | Wall |
| 6,417,894 B1 | 7/2002 | Goff |
| 6,441,342 B1 | 8/2002 | Hsu |
| 6,445,964 B1 | 9/2002 | White |
| 6,469,752 B1 | 10/2002 | Ishikawa |
| 6,476,354 B1 | 11/2002 | Jank |
| 6,479,793 B1 | 11/2002 | Wittmann |
| 6,506,997 B2 | 1/2003 | Matsuyama |
| 6,516,300 B1 | 2/2003 | Rakshit |
| 6,572,379 B1 | 6/2003 | Sears |
| 6,583,386 B1 | 6/2003 | Ivkovich |
| 6,596,972 B1 | 7/2003 | Di Novo |
| 6,614,002 B2 | 9/2003 | Weber |
| 6,621,049 B2 | 9/2003 | Suzuki |
| 6,622,906 B1 | 9/2003 | Kushibe |
| 6,647,288 B2 | 11/2003 | Madill |
| 6,670,574 B1 | 12/2003 | Bates |
| 6,697,761 B2 | 2/2004 | Akatsuka |
| 6,703,585 B2 | 3/2004 | Suzuki |
| 6,710,298 B2 | 3/2004 | Eriksson |
| 6,728,582 B1 | 4/2004 | Wallack |
| 6,734,393 B1 | 5/2004 | Friedl |
| 6,744,011 B1 | 6/2004 | Hu |
| 6,748,249 B1 | 6/2004 | Eromaki |
| 6,750,428 B2 | 6/2004 | Okamoto |
| 6,753,909 B1 | 6/2004 | Westerman |
| 6,768,974 B1 | 7/2004 | Nanjundan |
| 6,795,068 B1 | 9/2004 | Marks |
| 6,839,049 B1 | 1/2005 | Koizumi |
| 6,857,553 B1 | 2/2005 | Hartman |
| 6,868,726 B2 | 3/2005 | Lemkin |
| 6,910,971 B2 | 6/2005 | Alsenz |
| 6,927,360 B2 | 8/2005 | Artelsmair |
| 6,937,329 B2 | 8/2005 | Esmiller |
| 6,967,635 B2 | 11/2005 | Hung |
| 6,977,357 B2 | 12/2005 | Hsu |
| 6,995,536 B2 | 2/2006 | Challoner |
| 7,015,419 B2 | 3/2006 | Hackl |
| 7,025,053 B1 | 4/2006 | Altamirano |
| 7,032,814 B2 | 4/2006 | Blankenship |
| 7,045,742 B2 | 5/2006 | Feichtinger |
| 7,081,888 B2 | 7/2006 | Cok |
| 7,120,473 B1 | 10/2006 | Hawkins |
| 7,132,617 B2 | 11/2006 | Lee |
| 7,132,623 B2 | 11/2006 | DeMiranda |
| 7,150,047 B2 | 12/2006 | Fergason |
| 7,173,215 B1 | 2/2007 | Kapoor |
| 7,181,413 B2 | 2/2007 | Hadden |
| 7,226,176 B1 | 6/2007 | Huang |
| 7,261,261 B2 | 8/2007 | Ligertwood |
| 7,342,210 B2 | 3/2008 | Fergason |
| 7,358,458 B2 | 4/2008 | Daniel |
| 7,465,230 B2 | 12/2008 | LeMay |
| 7,474,760 B2 | 1/2009 | Hertzman |
| 7,523,069 B1 | 4/2009 | Friedl |
| 7,564,005 B2 | 7/2009 | Cabanaw |
| 7,574,172 B2 | 8/2009 | Clark |
| 7,577,285 B2 | 8/2009 | Schwarz |
| D614,217 S | 4/2010 | Peters |
| 7,698,094 B2 | 4/2010 | Aratani |
| D615,573 S | 5/2010 | Peters |
| 7,766,213 B2 | 8/2010 | Henrikson |
| 7,789,811 B2 | 9/2010 | Cooper |
| 7,813,830 B2 | 10/2010 | Summers |
| 7,826,984 B2 | 11/2010 | Sjostrand |
| 7,831,098 B2 | 11/2010 | Melikian |
| 7,839,416 B2 | 11/2010 | Ebensberger |
| 7,845,560 B2 | 12/2010 | Emanuel |
| D631,074 S | 1/2011 | Peters |
| 7,899,618 B2 | 3/2011 | Ledet |
| 7,962,967 B2 | 6/2011 | Becker |
| 8,019,144 B2 | 9/2011 | Sugihara |
| 8,044,942 B1 | 10/2011 | Leonhard |
| 8,046,178 B2 | 10/2011 | Dai |
| 8,100,694 B2 | 1/2012 | Portoghese |
| 8,110,774 B2 | 2/2012 | Huonker |
| 8,235,588 B2 | 8/2012 | Louban |
| 8,248,324 B2 | 8/2012 | Nangle |
| 8,274,013 B2 | 9/2012 | Wallace |
| 8,393,519 B2 | 3/2013 | Allehaux |
| 8,406,682 B2 | 3/2013 | Elesseily |
| 8,431,862 B2 | 4/2013 | Kachline |
| 8,432,476 B2 | 4/2013 | Ashforth |
| 8,502,866 B2 | 8/2013 | Becker |
| 8,512,043 B2 | 8/2013 | Choquet |
| 8,541,746 B2 | 9/2013 | Andres |
| 8,657,605 B2 | 2/2014 | Wallace |
| 8,681,178 B1 | 3/2014 | Tseng |
| 8,686,318 B2 | 4/2014 | Albrecht |
| 8,692,157 B2 | 4/2014 | Daniel |
| 8,698,843 B2 | 4/2014 | Tseng |
| 8,747,116 B2 | 6/2014 | Zboray |
| 8,777,629 B2 | 7/2014 | Kreindl |
| 8,803,908 B2 | 8/2014 | Van Osten |
| 8,834,168 B2 | 9/2014 | Peters |
| 8,851,896 B2 | 10/2014 | Wallace |
| 8,860,760 B2 | 10/2014 | Chen |
| 8,911,237 B2 | 12/2014 | Postlethwaite |
| 8,915,740 B2 | 12/2014 | Zboray |
| 8,946,595 B2 | 2/2015 | Ishida |
| 8,953,033 B2 | 2/2015 | Yamane |
| 8,953,909 B2 | 2/2015 | Guckenberger |
| RE45,398 E | 3/2015 | Wallace |
| 8,987,628 B2 | 3/2015 | Daniel |
| 8,990,842 B2 | 3/2015 | Rowley |
| 8,992,226 B1 | 3/2015 | Leach |
| 9,011,154 B2 | 4/2015 | Kindig |
| 9,012,802 B2 | 4/2015 | Daniel |
| 9,050,678 B2 | 6/2015 | Daniel |
| 9,050,679 B2 | 6/2015 | Daniel |
| 9,089,921 B2 | 7/2015 | Daniel |
| 9,101,994 B2 | 8/2015 | Albrecht |
| 9,196,169 B2 | 11/2015 | Wallace |
| 9,218,745 B2 | 12/2015 | Choquet |
| 9,230,449 B2 | 1/2016 | Conrardy |
| 9,269,279 B2 | 2/2016 | Penrod |
| 9,293,056 B2 | 3/2016 | Zboray |
| 9,293,057 B2 | 3/2016 | Zboray |
| 9,318,026 B2 | 4/2016 | Peters |
| 9,330,575 B2 | 5/2016 | Peters |
| 9,336,686 B2 | 5/2016 | Peters |
| 9,402,122 B2 | 7/2016 | Richardson |
| 9,573,215 B2 | 2/2017 | Pfeifer |
| 9,685,099 B2 | 6/2017 | Boulware |
| 9,724,787 B2 | 8/2017 | Becker |
| 9,789,603 B2 | 10/2017 | Jacobsen |
| 2001/0026445 A1 | 10/2001 | Naghi |
| 2001/0032508 A1 | 10/2001 | Lemkin |
| 2002/0043607 A1 | 4/2002 | Tajima |
| 2002/0071550 A1 | 6/2002 | Pletikosa |
| 2002/0105797 A1 | 8/2002 | Navid |
| 2002/0114653 A1 | 8/2002 | Gatta |
| 2002/0148745 A1 | 10/2002 | Chang |
| 2002/0153354 A1 | 10/2002 | Norby |
| 2003/0011673 A1 | 1/2003 | Eriksson |
| 2003/0092496 A1 | 5/2003 | Alsenz |
| 2003/0172032 A1 | 9/2003 | Choquet |
| 2004/0058703 A1 | 3/2004 | Eromaki |
| 2004/0068335 A1 | 4/2004 | Ferla |
| 2004/0069754 A1 | 4/2004 | Bates |
| 2004/0099648 A1 | 5/2004 | Hu |
| 2004/0175684 A1 | 9/2004 | Kaasa |
| 2004/0223148 A1 | 11/2004 | Takemura |
| 2004/0227730 A1 | 11/2004 | Sugihara |
| 2004/0251910 A1 | 12/2004 | Smith |
| 2005/0006363 A1 | 1/2005 | Hsu |
| 2005/0012598 A1 | 1/2005 | Berquist |
| 2005/0016979 A1 | 1/2005 | Stein |

(56) References Cited

U.S. PATENT DOCUMENTS

| | | |
|---|---|---|
| 2005/0017152 A1 | 1/2005 | Fergason |
| 2005/0073506 A1 | 4/2005 | Durso |
| 2005/0127052 A1 | 6/2005 | Spencer |
| 2005/0133488 A1 | 6/2005 | Blankenship |
| 2005/0135682 A1 | 6/2005 | Abrams |
| 2005/0179654 A1 | 8/2005 | Hawkins |
| 2005/0197115 A1 | 9/2005 | Clark |
| 2005/0207102 A1 | 9/2005 | Russo |
| 2005/0219206 A1 | 10/2005 | Schena |
| 2005/0227635 A1 | 10/2005 | Hawkins |
| 2005/0256611 A1 | 11/2005 | Pretlove |
| 2006/0010551 A1 | 1/2006 | Bishop |
| 2006/0081740 A1 | 4/2006 | Bellavance |
| 2006/0136183 A1 | 6/2006 | Choquet |
| 2006/0151446 A1 | 7/2006 | Schneider |
| 2006/0163228 A1 | 7/2006 | Daniel |
| 2006/0173619 A1 | 8/2006 | Brant |
| 2006/0212169 A1 | 9/2006 | Luthardt |
| 2006/0241432 A1 | 10/2006 | Herline |
| 2007/0038400 A1 | 2/2007 | Lee |
| 2007/0051711 A1 | 3/2007 | Kachline |
| 2007/0056942 A1 | 3/2007 | Daniel et al. |
| 2007/0114215 A1 | 5/2007 | Bill |
| 2007/0115202 A1 | 5/2007 | Kiesenhofer |
| 2007/0164006 A1 | 7/2007 | Burgstaller |
| 2007/0187378 A1 | 8/2007 | Karakas |
| 2007/0188606 A1 | 8/2007 | Atkinson |
| 2007/0209586 A1 | 9/2007 | Ebensberger |
| 2007/0221636 A1 | 9/2007 | Monzyk |
| 2007/0247793 A1 | 10/2007 | Carnevali |
| 2007/0248261 A1 | 10/2007 | Zhou |
| 2007/0264620 A1 | 11/2007 | Maddix |
| 2007/0278196 A1 | 12/2007 | James |
| 2007/0291166 A1 | 12/2007 | Misawa |
| 2008/0030631 A1 | 2/2008 | Gallagher |
| 2008/0038702 A1 | 2/2008 | Choquet |
| 2008/0061113 A9 | 3/2008 | Seki |
| 2008/0077422 A1 | 3/2008 | Dooley |
| 2008/0124698 A1 | 5/2008 | Ebensberger |
| 2008/0128395 A1 | 6/2008 | Aigner |
| 2008/0128400 A1 | 6/2008 | Michels |
| 2008/0149602 A1 | 6/2008 | Lenzner |
| 2008/0149608 A1 | 6/2008 | Albrecht |
| 2008/0158502 A1 | 7/2008 | Becker |
| 2008/0168290 A1 | 7/2008 | Jobs |
| 2008/0169277 A1 | 7/2008 | Achtner |
| 2008/0234960 A1 | 9/2008 | Byington |
| 2008/0314887 A1 | 12/2008 | Stoger |
| 2009/0005728 A1 | 1/2009 | Weinert |
| 2009/0057285 A1 | 3/2009 | Bashore |
| 2009/0057286 A1 | 3/2009 | Ihara |
| 2009/0109128 A1 | 4/2009 | Nangle |
| 2009/0146359 A1 | 6/2009 | Canfield |
| 2009/0152251 A1 | 6/2009 | Dantinne |
| 2009/0161212 A1 | 6/2009 | Gough |
| 2009/0173726 A1 | 7/2009 | Davidson |
| 2009/0189974 A1 | 7/2009 | Deering |
| 2009/0190826 A1 | 7/2009 | Tate et al. |
| 2009/0200281 A1 | 8/2009 | Hampton |
| 2009/0200282 A1 | 8/2009 | Hampton |
| 2009/0230107 A1 | 9/2009 | Ertmer |
| 2009/0231423 A1 | 9/2009 | Becker |
| 2009/0236325 A1 | 9/2009 | Gozalbo |
| 2009/0249606 A1 | 10/2009 | Diez |
| 2009/0283021 A1 | 11/2009 | Wong |
| 2009/0298024 A1 | 12/2009 | Batzler |
| 2009/0313549 A1 | 12/2009 | Casner |
| 2009/0323121 A1 | 12/2009 | Valkenburg |
| 2010/0020483 A1 | 1/2010 | Ma |
| 2010/0048273 A1 | 2/2010 | Wallace |
| 2010/0062405 A1 | 3/2010 | Zboray |
| 2010/0062406 A1* | 3/2010 | Zboray .................. G09B 19/24 434/234 |
| 2010/0088793 A1 | 4/2010 | Ghisleni |
| 2010/0123664 A1 | 5/2010 | Shin |
| 2010/0133247 A1 | 6/2010 | Mazumder |
| 2010/0145520 A1 | 6/2010 | Gerio |
| 2010/0201803 A1 | 8/2010 | Melikian |
| 2010/0207620 A1 | 8/2010 | Gies |
| 2010/0224610 A1 | 9/2010 | Wallace |
| 2010/0238119 A1 | 9/2010 | Dubrovsky |
| 2010/0245273 A1 | 9/2010 | Hwang |
| 2010/0283588 A1 | 11/2010 | Gomez |
| 2010/0291313 A1 | 11/2010 | Ling |
| 2010/0314362 A1 | 12/2010 | Albrecht |
| 2011/0000892 A1 | 1/2011 | Mueller |
| 2011/0006047 A1 | 1/2011 | Penrod |
| 2011/0091846 A1 | 4/2011 | Kreindl |
| 2011/0092828 A1 | 4/2011 | Spohn |
| 2011/0114615 A1 | 5/2011 | Daniel |
| 2011/0117527 A1 | 5/2011 | Conrardy |
| 2011/0176720 A1 | 7/2011 | VanOsten |
| 2011/0183304 A1 | 7/2011 | Wallace |
| 2011/0198329 A1 | 8/2011 | Davidson |
| 2011/0220616 A1 | 9/2011 | Mehn |
| 2011/0220619 A1 | 9/2011 | Mehn |
| 2011/0240605 A1 | 10/2011 | Takayama |
| 2011/0249090 A1 | 10/2011 | Moore |
| 2011/0284508 A1 | 11/2011 | Miura |
| 2011/0285290 A1 | 11/2011 | Griffin |
| 2011/0286005 A1 | 11/2011 | Yamamoto |
| 2011/0290765 A1 | 12/2011 | Albrecht |
| 2011/0313731 A1 | 12/2011 | Vock |
| 2012/0007748 A1 | 1/2012 | Forgues |
| 2012/0037600 A1 | 2/2012 | Katoh |
| 2012/0048838 A1 | 3/2012 | Ishida |
| 2012/0072021 A1 | 3/2012 | Walser |
| 2012/0077174 A1 | 3/2012 | DePaul |
| 2012/0105476 A1 | 5/2012 | Tseng |
| 2012/0113512 A1 | 5/2012 | Tsanev |
| 2012/0122062 A1 | 5/2012 | Yang |
| 2012/0175834 A1 | 7/2012 | Hamm |
| 2012/0180180 A1 | 7/2012 | Steve |
| 2012/0188365 A1 | 7/2012 | Stork |
| 2012/0189993 A1 | 7/2012 | Kindig |
| 2012/0205359 A1 | 8/2012 | Daniel |
| 2012/0231894 A1 | 9/2012 | Nicora |
| 2012/0248080 A1 | 10/2012 | Hutchison |
| 2012/0248083 A1 | 10/2012 | Garvey |
| 2012/0291172 A1 | 11/2012 | Wills |
| 2012/0298640 A1* | 11/2012 | Conrardy ................. B23K 37/04 219/130.01 |
| 2012/0323496 A1 | 12/2012 | Burroughs |
| 2013/0040270 A1 | 2/2013 | Albrecht |
| 2013/0064427 A1 | 3/2013 | Picard et al. |
| 2013/0081293 A1 | 4/2013 | Delin |
| 2013/0119037 A1 | 5/2013 | Daniel |
| 2013/0178952 A1 | 7/2013 | Wersborg |
| 2013/0182070 A1 | 7/2013 | Peters |
| 2013/0183645 A1 | 7/2013 | Wallace |
| 2013/0189656 A1 | 7/2013 | Zboray |
| 2013/0189657 A1 | 7/2013 | Wallace |
| 2013/0189658 A1 | 7/2013 | Peters |
| 2013/0200882 A1 | 8/2013 | Almalki |
| 2013/0203029 A1 | 8/2013 | Choquet |
| 2013/0206741 A1 | 8/2013 | Pfeifer |
| 2013/0209976 A1 | 8/2013 | Postlethwaite |
| 2013/0230832 A1 | 9/2013 | Peters |
| 2013/0252214 A1 | 9/2013 | Choquet |
| 2013/0256289 A1 | 10/2013 | Knoener |
| 2013/0262000 A1 | 10/2013 | Hutchison |
| 2013/0264315 A1 | 10/2013 | Hung |
| 2013/0264322 A1 | 10/2013 | Bornemann |
| 2013/0265416 A1 | 10/2013 | Enyedy |
| 2013/0288211 A1 | 10/2013 | Patterson |
| 2013/0326842 A1 | 12/2013 | Pearson |
| 2014/0008088 A1 | 1/2014 | Chellew |
| 2014/0017642 A1 | 1/2014 | Postlethwaite |
| 2014/0042135 A1 | 2/2014 | Daniel |
| 2014/0042137 A1 | 2/2014 | Daniel |
| 2014/0069899 A1 | 3/2014 | Mehn |
| 2014/0131337 A1 | 5/2014 | Williams |
| 2014/0184496 A1 | 7/2014 | Gribetz |
| 2014/0220522 A1 | 8/2014 | Peters |

(56) References Cited

U.S. PATENT DOCUMENTS

| | | |
|---|---|---|
| 2014/0234813 A1 | 8/2014 | Peters |
| 2014/0263227 A1 | 9/2014 | Daniel |
| 2014/0315167 A1 | 10/2014 | Kreindl |
| 2014/0322684 A1 | 10/2014 | Wallace |
| 2014/0346158 A1 | 11/2014 | Matthews |
| 2015/0056584 A1 | 2/2015 | Boulware |
| 2015/0056585 A1 | 2/2015 | Boulware |
| 2015/0170539 A1 | 6/2015 | Barrera |
| 2015/0209887 A1 | 7/2015 | DeLisio |
| 2015/0325153 A1 | 11/2015 | Albrecht |
| 2015/0328710 A1 | 11/2015 | Kachline |
| 2016/0093233 A1 | 3/2016 | Boulware |
| 2016/0203734 A1 | 7/2016 | Boulware |
| 2016/0203735 A1 | 7/2016 | Boulware |
| 2016/0236303 A1 | 8/2016 | Matthews |
| 2016/0358503 A1 | 12/2016 | Batzler |
| 2017/0148352 A1 | 5/2017 | Becker |

FOREIGN PATENT DOCUMENTS

| | | |
|---|---|---|
| CA | 2549553 | 7/2004 |
| CA | 2554498 | 4/2006 |
| CN | 1264822 | 8/2000 |
| CN | 100371672 | 12/2004 |
| CN | 1841321 | 10/2006 |
| CN | 1866317 | 11/2006 |
| CN | 1909020 | 2/2007 |
| CN | 101218060 | 7/2008 |
| CN | 201181527 | 1/2009 |
| CN | 101502906 | 8/2009 |
| CN | 101770710 | 7/2010 |
| CN | 102049595 | 5/2011 |
| CN | 102083580 | 6/2011 |
| CN | 102165504 | 8/2011 |
| CN | 102165505 | 8/2011 |
| CN | 102298858 | 12/2011 |
| CN | 102371564 | 3/2012 |
| CN | 202200202 | 4/2012 |
| CN | 102441737 | 5/2012 |
| CN | 103038804 | 4/2013 |
| CN | 202877704 | 4/2013 |
| CN | 103071909 | 5/2013 |
| CN | 103143810 | 6/2013 |
| CN | 103392089 | 11/2013 |
| CN | 203276641 | 11/2013 |
| CN | 103831553 | 6/2014 |
| CN | 203778997 | 8/2014 |
| DE | 202010011064 | 10/2010 |
| DE | 102010038902 | 2/2012 |
| EP | 0323277 | 7/1989 |
| EP | 0878263 | 11/1998 |
| EP | 0963744 | 12/1999 |
| EP | 1029306 | 8/2000 |
| EP | 1295195 | 6/2001 |
| EP | 1573699 | 9/2005 |
| EP | 1797545 | 6/2007 |
| EP | 1864744 | 12/2007 |
| EP | 2022592 | 2/2009 |
| EP | 2415560 | 2/2014 |
| ES | 2438440 | 1/2014 |
| FR | 1456780 | 7/1966 |
| FR | 2827066 | 1/2003 |
| GB | 2454232 A | 5/2009 |
| JP | H11146387 | 5/1999 |
| JP | 2000298427 | 10/2000 |
| JP | 2002317557 | 10/2002 |
| JP | 2004181493 | 7/2004 |
| JP | 2007021542 | 2/2007 |
| JP | 2009125790 | 6/2009 |
| KR | 100876425 | 12/2008 |
| KR | 20110000152 | 1/2011 |
| SU | 846203 | 7/1981 |
| SU | 972552 | 11/1982 |
| SU | 1324050 | 7/1987 |
| SU | 1354234 | 11/1987 |
| SU | 1489933 | 6/1989 |
| SU | 1638145 | 3/1991 |
| WO | 9958286 | 11/1999 |
| WO | 03019349 | 1/2003 |
| WO | 2004057554 | 7/2004 |
| WO | 2005102230 | 11/2005 |
| WO | 2005110658 | 11/2005 |
| WO | 2006004427 | 1/2006 |
| WO | 2006034571 | 4/2006 |
| WO | 2007009131 | 1/2007 |
| WO | 2007044135 | 4/2007 |
| WO | 2008076777 | 6/2008 |
| WO | 2009022443 | 2/2009 |
| WO | 2009053829 | 4/2009 |
| WO | 2009060231 | 5/2009 |
| WO | 2009092944 | 7/2009 |
| WO | 2009146359 | 12/2009 |
| WO | 2010000003 | 1/2010 |
| WO | 2010020867 | 2/2010 |
| WO | 2010020869 | 2/2010 |
| WO | 2010020870 | 2/2010 |
| WO | 2010111722 | 10/2010 |
| WO | 2011112493 | 9/2011 |
| WO | 2011150165 | 12/2011 |
| WO | 2012036710 | 3/2012 |
| WO | 2012137060 | 10/2012 |
| WO | 2013023012 | 2/2013 |
| WO | 2013061518 | 5/2013 |
| WO | 2013138831 | 9/2013 |
| WO | 2013186413 | 12/2013 |
| WO | 2014007830 | 1/2014 |
| WO | 2014074297 | 5/2014 |
| WO | 2014140719 | 9/2014 |

OTHER PUBLICATIONS

"NJC Technology Displayed at ShipTech 2005", Welding Journal, vol. 84, No. 3, Mar. 2005, p. 54, https://app.aws.org/w/r/www/wj/2005/03/WJ_2005_03.pdf.

"Sheet Metal Conference XXII," Conference Program, American Welding Society, May 2006, Detroit.

"SOLDAMATIC: Augmented Training Technology for Welding," Seabery Augmented Training Technology, Seabery Soluciones, 2011.

"Virtual Reality Program to Train Welders for Shipbuilding", American Welding Society, Navy Joining Center, https://app.aws.org/wj/2004/04/052/.

"Virtual Reality Welder Training Initiatives: Virtual Welding Lab Pilot," Paul D. Camp Community College, Advanced Science & Automation Corporation, Northrop Grumman Newport News, Nov. 22, 2006, http://www.nsrp.org/6-Presentations/WD/103106_Virtual_Reality_Welder.pdf.

"Virtual Welding—A Low Cost Virtual Reality Welder Training System", Interim Status Report # 4, Technology Investment Agreement 2008-600, Feb. 18, 2009, http://www.nsrp.org/3-Key_Deliverables/FY08_Low-Cost_Virtual_Reality_Welder_Trainer/FY08_Low-Cost_Virtual_Reality_Welder_Trainer-Interim2.pdf.

"Virtual Welding: A Low Cost Virtual Reality Welder Training System," NSRP ASE, Feb. 19, 2009, http://www.nsrp.org/6-Presentations/WD/020409_Virtual_Welding_Wilbur.pdf.

"Vision for Welding Industry," American Welding Society, Apr. 22, 1999, http://www.aws.org/library/doclib/vision.pdf.

"Welding in Defense Industry," American Welding Society conference schedule, 2004. https://app.aws.org/conferences/defense/live_index.html.

"Welding Technology Roadmap," prepared by Energetics, Inc., Columbia, MD, in cooperation with The American Welding Society and The Edison Welding Institute, Sep. 2000.

123arc.com—"Weld into the future"; 2000.

Advance Program of American Welding Society Programs and Events, Nov. 11-14, 2007, Chicago.

Aiteanu, Dorin, and Axel Graser, "Computer-Aided Manual Welding Using an Augmented Reality Supervisor," Sheet Metal Welding Conference XII, Livoinia, MI, May 9-12, 2006, pp. 1-14.

Aiteanu, Dorin, et al., "A Step Forward in Manual Welding: Demonstration of Augmented Reality Helmet," Institute of Automation, University of Bremen, Germany, 2003.

(56) References Cited

OTHER PUBLICATIONS

Aiteanu et al., Generation and Rendering of a Virtual Welding Seam in an Augmented Reality Training Envionment, Proceedings of the Sixth IASTED International Conference Visualization, Imaging, and Image Proceeding, Aug. 28-30, 2006, Palma de Mallorca, Spain ISBN Hardcapy: 0-88986-598-1 /CD: 0-88986-600-7 (8 pages).
American Welding Society Forms: typical Procedure Qualification Record and Welding Procedure Specification forms.
American Welding Society's Virtual Welding Trailer to Debut at FABTECH Careers in Welding Trailer Appeals to New Generation of Welders, Miami, Florida, Nov. 3, 2011.
ArcSentry Weld Monitoring System, Version 3, Users Manual, Native American Technologies, Golden, CO, Dec. 10, 1999.
ARVIKA Forum Vorstellung Projeckt PAARA, BMW Group Virtual Reality Center, Nuernberg, 2003.
Ascension Technology Corporation: Tracking 3D Worlds: http://ascension-tech.com/, Dec. 1996.
Barckhoff, J.R.; "Total Welding Managemet," American Welding Society, 2005.
Bender Shipbuilding and Repair, Co., "Virtual Welding—A Low Cost Virtual Reality Welder Training System", Technical Proposal, Jan. 23, 2008.
Byrd, Alex Preston, "Identifying the effects of human factors and training methods on a weld training program" (2014). Graduate Theses and Dissertations. Paper 13991.
Central Welding Supply http://www.welders-direct.com/ Feb. 29, 2000.
Choquet, Claude, ARC+ & ARC PC Welding Simulators: Teach Welders with Virtual Interactive 3D Technologies; Jul. 2010.
Choquet, Claude, ARC+: Today's Virtual Reality Solution for Welders, Jun. 1, 2008.
Cybernetics: Enhancing Human Performance found in the DTIC Review dated Mar. 2001, p. 186/19. See http://www.dtic.mil/dtic/tr/fulltext/u2/a385219.pdf.
Echtler, Florian, Fabian Stuurm, Kay Kindermann, Gudrun Klinker, Joachim Stilla, Jorn Trilk, Hesam Najafi, "The Intelligent Welding Gun: Augmented Reality for Experimental Vehicle Construction," Virtual and Augmented Reality Applications in Manufacturing, Ong S.K and Nee A.Y.C., eds., Springer Verlag, 2003, pp. 1-27.
Evaluating Two Novel Tactile Feedback Devices, by Thomas Hulin, Phillipp Kremer, Robert Scheibe, Simon Schaetzle and Carsten Preusche presented at the 4th International Conference on Enactive Interfaces, Grenoble, France, Nov. 19-22, 2007.
EWI, "EWI ArcCheck," marketing brochure, Columbus, Ohio.
EWI, "EWI SkillBuilder," marketing brochure, Columbus, Ohio.
Fast et al., Virtual Training for Welding, Proceedings of the Third IEEE and ACM International Symposium on Mixed and Augmented Reality (ISMAR 2004); 0-7695-2191-6/04; 2004.
Fast, Kenneth, Jerry Jones, and Valerie Rhoades; "Virtual Welding—A Low Cost Virtual Reality Welder Training System Phase II," National Shipbuilding Research Program (NSRP), NSRP ASE Technology Investment Agreement No. 2010-357, Feb. 29, 2012, http://www.nsrp.org/3-RA-Panel_Final_Reports/FY08_Virtual_Welder_Final_Report.pdf.
Fite-Georgel, Pierre; "Is there a Reality in Industrial Augmented Reality?" 10th IEEE International Symposium on Mixed and Augmented Reality (ISMAR), 2011.
Fridenfalk et al., Design and Validation of a Universal 6D Seam Tracking System in Robotic Welding Based on Laser Scanning, Industrial Robotics: Programming, Simulation, and Application, ISBN 3-86611-286-6, pp. 702, ARS/plV, Germany, Dec. 2006, edited by Kin Huat.
Fronius "The Ghost": http://www.fronius.com/cps/rde/xchg/SID-3202EAB7-AE082518/fronius_interational/hs.xsl/79_15490_ENG_HTML.htm; 2006.
Fronius International GmbH—Focus on Welding—Fronius Virtual Welding; http://www.fronius.com/cps/rde/xchg/SID-99869147-0110E322/fronius_intenational/hs.xsl/79_15490_ENG_HML.htm; 2006.
Fronius Perfect Welding; 06,3082, EN v01 2010 aw05; Virtual Welding—The training method of the future; Feb. 20, 2012.

ftp://www.hitl.washington.edu/pub/scivw/publications/IDS-pdf/HAPTIC1.PDF, (University of Washington): Table 11, Tactile Feedback Actuator Technologies, p. 119, below the table is a. Based on Hasser (1995, 1996).
GAWDA—Welding & Gases Today Online GAWDA Media Blog; Will Games Turn Welding into a Virtual Market? Friday, Dec. 2, 2011; http://www.weldingandgasestoday.org/blogs/Devin-OToole/index.php/ta . . . .
Gundersen, O., et al. "The Use of an Integrated Multiple Neural Network Structure for Simultaneous Prediction of Weld Shape, Mechanical Properties, and Distortion in 6063-T6 and 6082-T6 Aluminum Assemblies", Mathematical Modelling of Weld Phenomena, vol. 5, Maney Publishing, 2001.
Haptic Feedback for Virtual Reality by Grigore C. Burdea dated 1996.
Hashimoto, Nobuyoshi et al., "Training System for Manual Arc Welding by Using Mixed Reality: Reduction of Position-Perception Error of Electrode Tip," Journal of the Japan Society for Precision Engineering, vol. 72, pp. 249-253, 2006.
Hemez, Francois M., Scott W. Doebling, "Uncertainty, Validation of Computer Models an the Myth of Numerical Predictability," Engineering Analysis Group (ESA-EA), Los Alamos National Laboratory, dated 2004.
Hillers, B, and Axel Graeser, "Direct welding arc observation withouth harsh flicker," FABTECH International and AWS Welding Show, 2007.
Hillers, B, and Axel Graeser, "Real time Arc-Welding Video Observation System," 62nd International Conference of IIW, Jul. 12-17, 2009, Singapore, 2009.
Hillers, B., et al.; "TEREBES: Welding Helmet with AR Capabilites," Institute of Automation, University of Bremen, and Institute of Industrial Engineering and Ergonomics, RWTH Aachen Universty, 2004.
Hillers, Bernd, Dorin Aiteanu, Axel Graser, "Augmented Reality—Helmet for the Manual Welding Process," Virtual and Augmented Reality Applications in Manufacturing, Institute of Automation, Universtity of Bremen, 2004.
Himperich, Frederick, "Applications in Augmented Reality in the Automotive Industry," Fachgebiet Augmented Reality, Department of Informatics, Jul. 4, 2007, p. 1-21.
Hodgson, et al. "Virtual Reality in the Wild: A Self-Contained and Wearable Simulation System." IEEE Virtual Reality, Mar. 4-8, 2012, Orange County, CA USA.
http://www.123arc.com "Simulation and Certification"; 2000.
Image from Sim Welder.com—R-V's Welder Training Goes Virtual, www.rvii.com/PDF/simwelder.pdf; Jan. 2010.
IMPACT Spring 2012 vol. 12, No. 2, Undergraduate Research in Information Technology Engineering, University of Virginia School of Engineering & Applied Science; 2012.
IMPACT Welding: miscellaneous examples from current and archived website, trade shows, etc. See, e.g., http://www.impactwelding.com.
Integrated Microelectromechanical Gyroscopes; Journal of Aerospace Engineering, Apr. 2003 pp. 65-75 (p. 65) by Huikai Xie and Garry K. Fedder.
International Search Report for PCT application No. PCT/US2009/045436, dated Nov. 9, 2009, 3 pgs.
International Search Report for PCT application No. PCT/US2012/050059, dated Nov. 27, 2012, 16 pgs.
International Search Report for PCT application No. PCT/US2013/038371, dated Jul. 31, 2013, 8 pgs.
International Search Report for PCT application No. PCT/US2013/066037, dated Mar. 11, 2014, 10 pgs.
International Search Report for PCT application No. PCT/US2013/066040, dated Mar. 11, 2014, 12 pgs.
International Search Report for PCT application No. PCT/US2014/018107, dated Jun. 2, 2014, 3 pgs.
International Search Report for PCT application No. PCT/US2014/018109, dated Jun. 2, 2014, 4 pgs.
International Search Report for PCT application No. PCT/US2014/018113, dated Jun. 2, 2014, 3pgs.
International Search Report for PCT application No. PCT/US2014/018114, dated Jun. 2, 2014, 4 pgs.

(56) References Cited

OTHER PUBLICATIONS

International Search Report for PCT application No. PCT/US2014/065498, dated May 11, 2015, 13 pgs.
International Search Report for PCT application No. PCT/US2014/065506, dated Jun. 26, 2015, 16 pgs.
International Search Report for PCT application No. PCT/US2014/065512, dated Jun. 8, 2015, 17 pgs.
International Search Report for PCT application No. PCT/US2014/065525, dated Jul. 23, 2015, 16 pgs.
International Search Report for PCT application No. PCT/US2014/067951, dated Feb. 24, 2015, 10 pgs.
International Search Report for PCT application No. PCT/US2015/037410, dated Nov. 6, 2015, 10 pgs.
International Search Report for PCT application No. PCT/US2015/037439, dated Nov. 3, 2015, 12 pgs.
International Search Report for PCT application No. PCT/US2015/037440, dated Nov. 3, 2015, 12 pgs.
International Search Report for PCT application No. PCT/US2015/039680, dated Sep. 23, 2015, 12 pgs.
International Search Report from PCT application No. PCT/US2014/018103, dated Jun. 30, 2014, 13 pgs.
International Search Report from PCT application No. PCT/US2015/043370, dated Dec. 4, 2015, 12 pgs.
International Search Report from PCT application No. PCT/US2015/058563, dated Jan. 29, 2016, 13 pgs.
International Search Report from PCT application No. PCT/US2015/058567, dated May 6, 2016, 15 pgs.
International Search Report from PCT application No. PCT/US2015/058569, dated Feb. 10, 2016, 12 pgs.
International Search Report from PCT application No. PCT/US2015/058660, dated Feb. 2, 2016, 14 pgs.
International Search Report from PCT application No. PCT/US2015/058664, dated Apr. 25, 2016, 17 pgs.
International Search Report from PCT application No. PCT/US2015/058666, dated Feb. 1, 2016, 11 pgs.
International Search Report from PCT application No. PCT/US2015/058667, dated Feb. 5, 2016, 14 pgs.
International Search Report from PCT application No. PCT/US2016/023612, dated Jul. 18, 2016, 11 pgs.
Jo et al., Visualization of Virtual Weld Beads, VRST 2009, Kyoto, Japan, Nov. 18-20, 2009; Electronics and Telecommunications Research Institute (ETRI) ACM 978-1 60558-869-8/09/0011.
Kiwinakiful; Holographic TV coming 2012 (as seen on BBC); http://www.youtube.com/watch?v=Ux6aD6vE9sk&feature=related, Jul. 2, 2011.
Kobayashi, Kazuhiko et al., "Modified Training System for Manual Arc Welding by Using Mixed Reality and Investigation of Its Effectiveness," Journal of the Japan Society for Precision Engineering, vol. 70, pp. 941-945, 2004.
Kobayashi, Kazuhiko et al., "Simulator of Manual Metal Arc Welding with Haptic Display," Chiba University, ICAT 2001, Dec. 2001.
Kobayashi, Kazuhiko et al., "Skill Training System of Manual Arc Welding by Means of Face-Shield HMD and Virtual Electrode," Chiba University, Japan, R. Nakatsu et al. (eds.), Entertainment Computing, Springer Science+Business Media, New York, 2003.
Kooima, Robert; Kinect +3D TV=Virtual Reality; http://www.youtube.com/watch?v=2MX1RinEXUM&feature=related, Feb. 26, 2011.
Leap Motion; https://www.leapmotion.com/, May 2012.
Lincoln Electric VRTEX Virtual Reality Arc Welding Trainer; http://www.lincolnelectric.com/en-us/equipment/training-equipment/pages/vrtex360.aspx; 1999.
MacCormick, John; How does the Kinect work?; http://users.dickinson.edu/~jmac/selected-talks/kinect.pdf, Dec. 1, 2011.
NAMeS Users Guide, N A Tech Neural Applications, Copyright 1997, 1998, 1999, 2000 Golden, CO (123 pages).
NAMeS, Native American Technologies Weld Measuring Software, Users Guide, 2000.

National Science Foundation—Where Discoveries Begin—Science and Engineering's Most Powerful Statements Are Not Made From Words Alone—Entry Details for NSF International Science & Engineering Visualization Challenge, Public Voting ended on Mar. 9, 2012; Velu the welder by Muralitharan Vengadasalam—Sep. 30, 2011; https://nsf-scivis.skild.com/skild2/NationalScienceFoundation/viewEntryDetail.action?pid.
Native American Technologies, "ArcDirector Weld Controller" web page, http://web.archive.org/web/20020608125127/http://www.natech-inc.com/arcdirector/index.html, published Jun. 8, 2002.
Native American Technologies, "ArcSentry Weld Quality Monitoring System" web page, http://web.archive.org/web/20020608124903/http://www.natech-inc.com/arcsentry1/index.html, published Jun. 8, 2002.
Native American Technologies, "P/NA.3 Process Modelling and Optimization" web pages, http://web.archive.org/web/20020608125619/http://www.natech-inc.com/pna3/index.html, published Jun. 8, 2002.
Native American Technologies, "Process Improvement Products" web page, http://web.archive.org/web/20020608050736/http://www.natech-inc.com/products.html, published Jun. 8, 2002.
Natural Point, Trackir; http://www.naturalpoint.com/trackir/, Dec. 2003.
Numerical Simulation F Arc Welding Process and its Application Dissertation for Ohio State University by Min Hyun Cho, M.S. 2006: See Internet as this document is security protected) https://etd.ohiolink.edu/!etd.send_file?accession=osu1155741113&disposition=attachment.
NZ Manufacturer Game promotes welding trade careers; http://nzmanufacturer.co.nz/2011/11/gme-promotes-welding-trade-careers/ . . . Compentenz Industry Training; www.competenz.org.nz; Game promotes welding trade careers, Nov. 7, 2011.
OptiTrack: Motion Capture Systems: http://www.naturalpoint.com/optitrack/, Mar. 2005.
Penrod, Matt; "New Welder Training Tools," EWI PowerPoint presentation, 2008.
PhaseSpace: Optical Motion Capture: http://phasespace.com/, 2009.
Playstation; Move Motion Controller: http://us.playstation.com/ps3/playstation-move/, Mar. 2010.
Polhemus: Innovation in Motion: http://polhemus.com/?page=researchandtechnology, 1992.
Porter et al, EWI-CRP Summary Report SR0512, Jul. 2005—Virtual Reality Welder Training.
Porter, Nancy C., Edison Welding Institute; J. Allan Cote, General Dynamics Electrict Boat; Timothy D. Gifford, VRSim; and Wim Lam, FCS Controls—Virtual Reality Welder Training—Project No. S1051 Navy Man Tech Program; Project Review for Ship Tech 2005,—Mar. 1, 2005, Biloxi, MS, http://www.nsrp.org/6-Presentations/WD/Virtual_Welder.pdf.
Porter, Nancy C., Edison Welding Institute; J.Allan Cote, General Dynamics Electric Boat; Timoty D. Gifford, VRSim; and Wim Lam, FCS Controls—Virtual Reality Welder Training—Session 5; Joining Technologies for Naval Applications; 2007.
Quebec International, May 28, 2008 'Video Game' Technology to Fill Growing Need; http://www.mri.gouv.qc.ca/portail/_scripts/actualites/viewnew.sap?NewID=5516.
Ryu, Jonghyun, Jaehoon Jung, Seojoon Kim, and Seungmoon Choi, "Perceptually Transparent Vibration Rendering Using a Vibration Motor for Haptic Interaction," 16 IEEE International Conference on Robot & Human Interactive Communication, Jeju, Korea, Aug. 26-29, 2007.
Sandor, Christian, Gudrun Klinker, "PAARTI: Development of an Intelligent Welding Gun for BMW," PIA 2003, Tokyo, Japan, Technical University of Munich Department of Informatics, Oct. 7, 2003.
Sandor, Christian, Gudrun Klinker; "Lessons Learned in Designing Ubiquitous Augmented Reality User Interfaces," Emerging Technologies of Augmented Reality Interfaces, Eds. Haller, M, Billinghurst, M., and Thomas, B., Idea Group Inc., 2006.
ShotOfFuel; Wii Head Tracking for 3D, http://www.youtube.com/watch?v=1x5ffF-0Wr4, Mar. 19, 2008.

(56) References Cited

OTHER PUBLICATIONS

Stone, R. T., K. Watts, and P. Zhong, "Virtual Reality Integrated Welder Training, Welding Research," Welding Journal, vol. 90, Jul. 2011, pp. 136-s-141-s, https://app.aws.org/wj/supplement/wj201107_s136.pdf.
TCS News & Events: Press Release: TCS wins the "People Choice" award from National Science Foundation, USA, pp. 1-6; Press Release May 21, 2012; http://www.tsc.com/news_events/press_releases/Pages/TCS_People_Choice_award_Natio . . . .
TeachWELD: Welding Simulator/Hands-On Learning for Welding: http://realityworks.com/products/teachweld-welding-simulator; 2012.
Terebes; miscellaneous examples from http://www.terebes.uni-bremen.de.
The Rutgers Master II—New Design Force-Feedback Glove by Mourad Bouzit, Member, IEEE,Grigore Burdea, Senior Member, IEEE, George Popescu, Member, IEEE, and Rares Bolan, Student Member, found in IEEE/ASME Transactions on Mechatronics, vol. 7, No. 2, Jun. 2002.
thefabricator.com—Arc Welding Article; Heston, Tim, Virtual welding—Training in a virtual environment gives welding students a leg up—Mar. 11, 2008.
Tschirner, Petra, Hillers, Bernd, and Graeser, Axel; "A Concept for the Application of Augmented Reality in Manual Gas Metal Arc Welding," Proceedings of the International Symposium on Mixed and Augmented Reality, 2002.
Vicon: Motion Capture Systems: http://vicon.com/, Dec. 1998.
Virtual Reality Training Manual Module 1—Training Overview—A Guide for Gas Metal Arc Welding—EWI 2006.
VRTEX 360 Operator's Manual, Lincoln Electric, Oct. 2012.
VRTEX 360, Lincoln Electric, Dec. 2009.
Weld Training Solutions, REALWELD, The Lincoln Electric Company, Jul. 2015.
Welding Journal, American Welding Society, Nov. 2007, https://app.aws.org/wj/2007/11/WJ_2007_11.pdf.
White, S., et al., "Low-Cost Simulated MIG Welding for Advancement in Technical Training," Virtual Reality, 15, 1, 69-81, Mar. 2011. ISSN:13594338 [Retrieved from EBSCOhost, Jun. 15, 2015].
Canadian Office Action Appln No. 2,961,806 dated Jan. 8, 2018 (3 pgs).
Canadian Office Action Appln No. 2,961,093 dated Mar. 5, 2018 (4 pgs).
Canadian Office Action Appln No. 2,961,255 dated Nov. 14, 2018 (4 pgs).
Communication from European Patent Office Appln. No. 15798269.5 dated Mar. 13, 2019.
Aiteanu, Dorin, "Virtual and Augmented Reality Supervisor for a New Welding Helmet" Nov. 15, 2005, pp. 1-150.

* cited by examiner

SYSTEM AND DEVICE FOR WELDING TRAINING

CROSS REFERENCE TO RELATED APPLICATIONS

This application is a Continuation of U.S. patent application Ser. No. 13/799,390, entitled "System and Device for Welding Training", filed Mar. 13, 2013, which is a Non provisional U.S. Patent Application of U.S. Provisional Patent Application No. 61/724,322, entitled "System and Device for Welding Training", filed Nov. 9, 2012, both of which are hereby incorporated by reference in their entireties for all purposes.

BACKGROUND

The invention relates generally to welding and, more particularly, to a system and device for welding training.

Welding is a process that has increasingly become utilized in various industries and applications. Such processes may be automated in certain contexts, although a large number of applications continue to exist for manual welding operations. In both cases, such welding operations rely on a variety of types of equipment to ensure the supply of welding consumables (e.g., wire feed, shielding gas, etc.) is provided to the weld in appropriate amounts at the desired time.

To perform manual welding operations, welding operators may be trained using a welding training system. The welding training system may be designed to train welding operators the proper techniques for performing various welding operations. Certain welding training systems may use virtual reality, augmented reality, or other training methods. As may be appreciated, these training systems may be expensive to acquire. Accordingly, welding training institutions may acquire a limited number of such training systems. Therefore, welding operators being trained by the welding training institutions may have a limited amount of time for hands-on training using the training systems.

BRIEF DESCRIPTION

In one embodiment, a welding training system includes a position detecting system configured to detect a distance between the position detecting system and objects within a field of view of the position detecting system, and to produce a map corresponding to the objects. The welding training system also includes markers configured to be coupled to a device of the welding training system. Furthermore, the markers are configured to be detected by the position detecting system.

In another embodiment, a method for determining a position of a welding torch, an orientation of the welding torch, or some combination thereof, includes detecting a first marker of the welding torch using a position detecting system. The position detecting system is configured to detect a distance between the position detecting system and objects within a field of view of the position detecting system, and to produce a map corresponding to the objects. The method also includes detecting a second marker of the welding torch using the position detecting system and calculating the position of the welding torch, the orientation of the welding torch, or some combination thereof, using the detected first and second markers.

In another embodiment, a method for determining a position, an orientation, or some combination thereof, of a welding torch and a welding workpiece includes detecting a first marker of the welding torch using a position detecting system. The position detecting system is configured to detect a distance between the position detecting system and objects within a field of view of the position detecting system, and to produce a map corresponding to the objects. The method also includes detecting a second marker of the welding torch using the position detecting system. The method includes detecting a first marker of the welding workpiece using the position detecting system and detecting a second marker of the welding workpiece using the position detecting system. The method also includes calculating the position, the orientation, or some combination thereof, of the welding torch and the welding workpiece using the first and second markers of the welding torch and the first and second markers of the welding workpiece.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
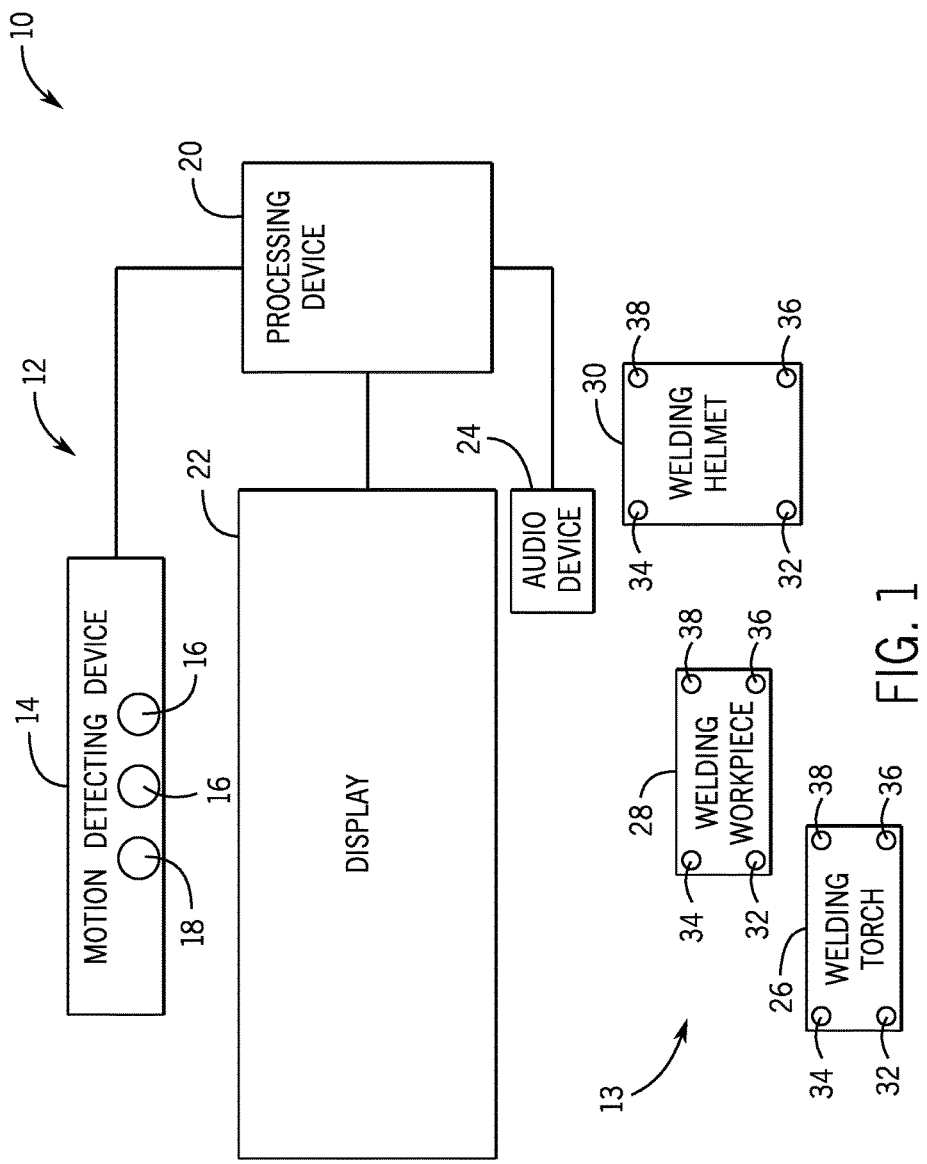
FIG. 1 is a block diagram of an embodiment of a welding training system in accordance with aspects of the present disclosure.

FIG. 1 is a block diagram of an embodiment of a welding training system 10. The welding training system 10 includes a detection system 12 and a welding system 13. As illustrated, the detection system 12 includes a motion detecting device 14 (e.g., a three-dimensional motion or position detecting device) that is used to detect position, orientation, and/or motion of objects in the vicinity of the welding system 13. The motion detecting device 14 may be configured to detect a distance between the motion detecting device 14 and all objects within a field of view of the motion detecting device 14. For example, the motion detecting device 14 may create a three-dimensional (3D) point cloud that maps a depth to each pixel of data received by a color camera of the motion detecting device 14. Furthermore, a 3D coordinate (e.g., x, y, z) may be assigned to each pixel. As may be appreciated, the motion detecting device 14 may use any suitable devices to detect the positioning and motion of the objects in the vicinity of the welding system 13. For example, in certain embodiments, the motion detecting device 14 includes built-in cameras 16 and an infrared emitter 18 that are used to determine a position and/or an orientation of devices in the welding system 13 (e.g., relative to the motion detecting device 14). In certain embodiments, the build-in cameras 16 include an RGB camera and an infrared camera. As may be appreciated, an RGB camera may be configured to detect three basic color components (e.g., red, green, blue) such that the detected three basic color components may be used to form an image. Furthermore, an infrared camera may be configured to detect infrared radiation such that the detected infrared radiation may be used to form an image. It should be noted that the motion detecting device 14 may be a commercially off-the-shelf (COTS) product available for consumer purchase. For example, the motion detecting device 14 may be a Kinect™ by Microsoft Corporation of Redmond, Wash., or a Leap device by Leap Motion of San Francisco, Calif. In addition, the motion detecting device 14 may be a computer accessory, or may be part of a video game system. Although only one motion detecting device 14 is illustrated in FIG. 1, in certain embodiments, multiple motion detecting devices 14 may be used to improve detection capabilities.

A processing device 20 (e.g., central processing unit) of the detection system 12 may be coupled to the motion detecting device 14 and may be configured to process data from the motion detecting device 14. For example, the processing device 20 may be configured to receive data from the cameras 16 and determine a position and/or an orientation of one or more detected objects based on the data. The processing device 20 may be coupled to a display 22 (e.g., tablet, touchscreen, monitor, etc.), on which images corresponding to the detected objects may be displayed. Furthermore, the processing device 20 may be coupled to an audio device 24 (e.g., speaker, microphone, etc) for providing an audio output and/or receiving an audio input.

The welding system 13 includes one or more welding devices 26, 28, and 30 that are configured to be detected by the motion detecting device 14 of the detection system 12. As may be appreciated, each of the welding devices 26, 28, and 30 may be any suitable welding device. For example, the welding devices 26, 28, and 30 may include a welding torch 26, a welding workpiece 28, a welding helmet 30, and so forth. As illustrated, each of the welding devices 26, 28, and 30 includes markers 32, 34, 36, and 38 that are configured to be detected by the motion detecting device 14. Although the markers 32, 34, 36, and 38 are illustrated in FIG. 1 as being generally circular, the markers 32, 34, 36, and 38 may be any suitable shape (e.g., square, rectangle, star, parallelogram, trapezoid, hexagon, etc.). Furthermore, the markers 32, 34, 36, and 38 may be any suitable size and any suitable color. As may be appreciated, the shape, the size, and/or the color of each marker 32, 34, 36, and 38 may be different. Accordingly, the markers 32, 34, 36, and 38 may be configured in any suitable manner to allow the motion detecting device 14 to distinguish between the markers 32, 34, 36, and 38 in order to determine the position and/or the orientation of the welding devices 26, 28, and 30. For example, an RGB camera of the motion detecting device 14 may be used to detect markers 32, 34, 36, and 38 where each marker has a different color. The markers 32, 34, 36, and 38 may include light-emitting diodes (LEDs) (or some other device configured to be illuminated), stickers, indentions, protrusions, molded components, printed components, covers, lenses, and so forth. For example, in certain embodiments, one or more of the markers 32, 34, 36, and 38 may include a cover or lens disposed over an LED. Moreover, the covers or lenses may have different shapes, sizes, and/or colors, while LEDs disposed under the covers or lenses may not have different shapes, sizes, and/or colors. In some embodiments, the welding devices 26, 28, and 30 may be manufactured with the markers 32, 34, 36, and 38. Moreover, in other embodiments, the markers 32, 34, 36, and 38 may be coupled to the welding devices 26, 28, and 30 at any time after the welding devices are manufactured. For example, the markers 32, 34, 36, and 38 may be sold separately from the welding devices 26, 28, and 30. Accordingly, the markers 32, 34, 36, and 38 may be attached to the welding devices 26, 28, and 30 by an operator. In certain embodiments, the welding devices 26, 28, and 30 may be configured so that they do not provide an electrical signal to the motion detecting device 14 (e.g., they may be configured as passive devices such that the motion, position, and/or orientation of the welding devices 26, 28, and 30 are detected solely by the motion detecting device 14 without the welding devices 26, 28, and 30 transmitting any signals to the motion detecting device 14). However, in such embodiments, the welding devices 26, 28, and 30 may still provide data to the detection system 12 that is not related to position and/or orientation (e.g., usage time, user identification, welding training initialization, welding training completion, and so forth). For example, the trigger of the welding torch 26 may be connected to the processing device 20 to indicate start and/or stop (e.g., wired, such as via a universal serial bus (USB) connection, and/or wireless).

As may be appreciated, a welding training system 10 that uses COTS products may be considerably less expensive than a welding training system 10 that does not use COTS products. Accordingly, the welding training system 10 described herein may provide a cost savings to an establishment that trains welding operators. Furthermore, due to the low cost of the welding training systems 10 described herein, an establishment that provides welding training may be able to provide multiple welding training systems 10 to allow welding operators being trained to have a greater amount of time to use the welding training systems 10.

Figure 2:
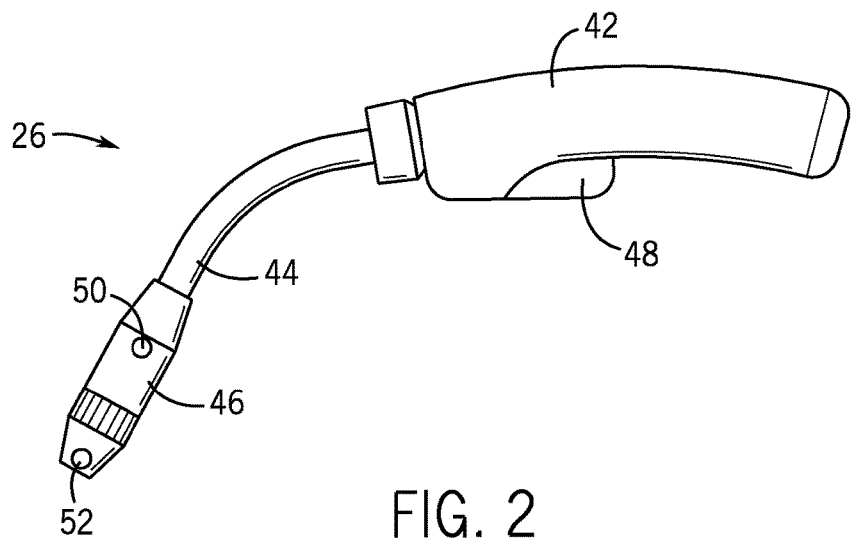
FIG. 2 is a side view of an embodiment of a welding torch configured to be used in the welding training system of FIG. 1 in accordance with aspects of the present disclosure.

FIG. 2 is a side view of an embodiment of a welding torch 26 configured to be used in the welding training system 10 of FIG. 1. As may be appreciated, the welding torch 26 may be an actual welding torch used to perform real welding operations, or a training welding torch. Accordingly, the welding torch 26 may be detected during an actual welding operation and/or a simulated welding operation. In the present embodiment, the welding torch 26 includes a handle 42, a neck 44, and a nozzle 46. Furthermore, the handle 42 includes a trigger 48 for initiating a welding operation (e.g., either a real world welding operation or a simulated welding operation). As illustrated in FIG. 2, the handle 42 is coupled to the nozzle 46 via the neck 44. As may be appreciated, the neck 44 and the nozzle 46 may be considered "non-handle portions" of the welding torch 26. The nozzle 46 includes markers 50 and 52 that are configured to be detected by the detection system 12. In other embodiments, any suitable location on the welding torch 26 may include markers 50 and 52. As may be appreciated, the markers 50 and 52 may be any suitable size, shape, and/or color for being detected by the detection system 12. Accordingly, the detection system 12 may determine a position (e.g., x-axis, y-axis, and z-axis) of each marker 50 and 52 with respect to the motion detecting device 14 of the detection system 12.

Figure 3:
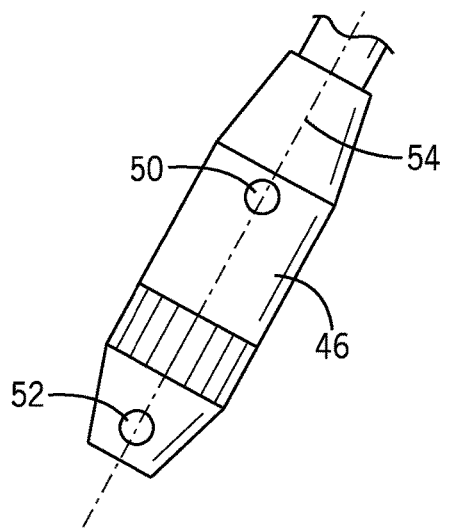
FIG. 3 is a side view of an embodiment of a nozzle of the welding torch of FIG. 2 with an orientation axis determined in accordance with aspects of the present disclosure.

FIG. 3 is a side view of an embodiment of the nozzle 46 of the welding torch 26 of FIG. 2 with an orientation axis 54 (e.g., a longitudinal axis of the nozzle 46). The orientation axis 54 may be determined by the detection system 12 using the markers 50 and 52. For example, the detection system 12 may detect a position of each of the markers 50 and 52 (e.g., and therefore the position of the welding torch 26) with respect to the motion detecting device 14 of the detection system 12. Furthermore, the detection system 12 may determine the orientation (e.g., pitch, roll, and yaw) of the welding torch 26 by virtually connecting the markers 50 and 52 to form the orientation axis 54.

Figure 4:
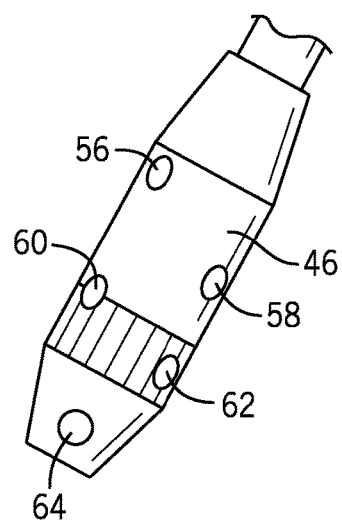
FIG. 4 is a side view of an embodiment of a nozzle of the welding torch of FIG. 2 having markers positioned around the nozzle in accordance with aspects of the present disclosure.

FIG. 4 is a side view of an embodiment of the nozzle 46 of the welding torch 26 of FIG. 2 having markers 56, 58, 60, 62, and 64 positioned around the exterior of the nozzle 46. As may be appreciated, the markers 56, 58, 60, 62, and 64 may be any suitable size, shape, and/or color for being detected by the detection system 12. The markers 56, 58, 60, 62, and 64 are positioned around the nozzle 46 of the welding torch 26 so that when the welding torch 26 is moved to various positions, the nozzle 46 will still be in view of the detection system 12. Accordingly, the position and/or the orientation of the welding torch 26 may be determined as the welding torch 26 is rotated around.

The position and/or the orientation of the welding torch 26 may be determined relative to a position and/or an orientation of a workpiece. Accordingly, in some embodiments, the workpiece may be positioned in a fixed position relative to the motion detecting device 14 of the detection system 12. For example, the motion detecting device 14 and the workpiece may be positioned using a mechanical fixture to ensure that the motion detecting device 14 is at a predetermined position and/or orientation relative to the workpiece. In other embodiments, a predefined calibration procedure may be used to determine the position of the workpiece relative to the motion detecting device 14. For example, the welding torch 26 may be touched to the workpiece at different locations to allow the detection system 12 to determine the position and/or the orientation of the workpiece based on the predefined calibration procedure. Furthermore, in certain embodiments, the detection system 12 may be configured to detect the position and/or the orientation of the workpiece using markers.

Figure 5:
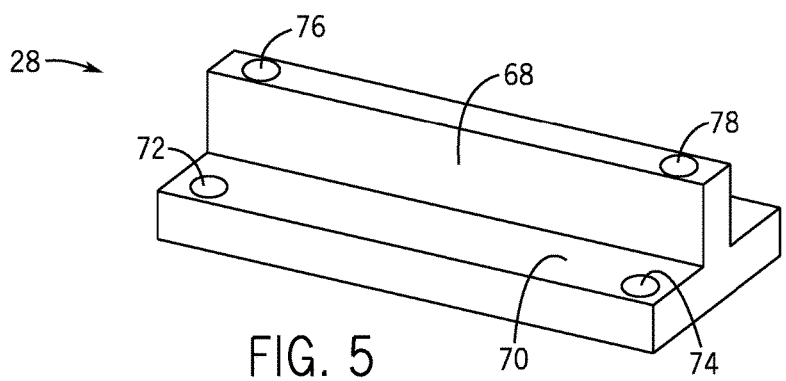
FIG. 5 is a perspective view of an embodiment of a workpiece configured to be used in the welding training system of FIG. 1 in accordance with aspects of the present disclosure.

Accordingly, FIG. 5 is a perspective view of an embodiment of a workpiece 28 configured to be used in the welding training system 10 of FIG. 1. In the illustrated embodiment, the workpiece 28 includes a vertical portion 68 and a horizontal portion 70 to be welded together (e.g., either in a real world or a virtual welding operation). As illustrated, a first set of markers 72 and 74 are positioned on the horizontal portion 70, while a second set of markers 76 and 78 are positioned on the vertical portion 68. Again, the markers 72, 74, 76, and 78 may be any suitable size, shape, and/or color for being detected by the detection system 12. Accordingly, the detection system 12 may determine a position (e.g., x-axis, y-axis, and z-axis) of each marker 72, 74, 76, and 78 of the workpiece 28. Furthermore, the detection system 12 may determine both a position and an orientation of the workpiece 28. With the position and orientation of the workpiece 28, the detection system 12 may determine the position and/or the orientation of the welding torch 26 (e.g., as described above with respect to FIGS. 2-4) relative to the workpiece 28. Although the workpiece 28 is configured for performing a tee joint, the workpiece 28 may be configured to perform a butt joint, a lap joint, or any other suitable configuration. Furthermore, the workpiece 28 may be configured for welding in any suitable orientation (e.g., flat, horizontal, vertical, overhead, etc.) and/or using any suitable welding technique (e.g., weaving, stitching, etc.).

Figure 6:
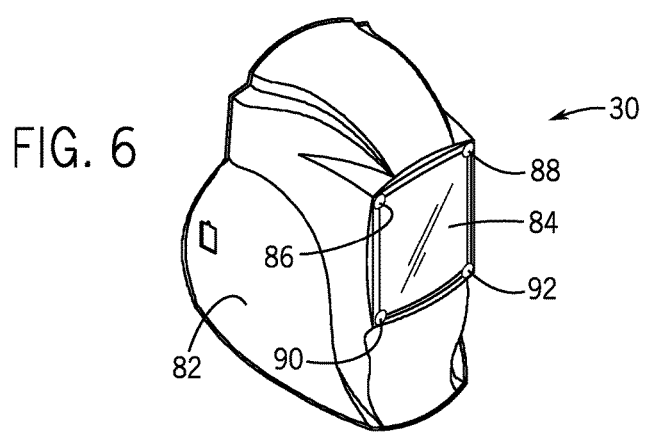
FIG. 6 is a perspective view of an embodiment of a welding helmet configured to be used in the welding training system of FIG. 1 in accordance with aspects of the present disclosure.

FIG. 6 is a perspective view of an embodiment of a welding helmet 30 configured to be used in the welding training system 10 of FIG. 1. The welding helmet 30 includes a helmet shell 82 and a lens assembly 84. When worn by a welding operator, the helmet shell 82 covers the head of the operator. As may be appreciated, the welding operator views a welding operation through the lens assembly 84. As illustrated, the welding helmet 30 includes markers 86, 88, 90, and 92 of the welding helmet 30. Again, like other markers previously described, the markers 86, 88, 90, and 92 may be any suitable size, shape, and/or color for being detected by the detection system 12. Accordingly, the detection system 12 may determine a position (e.g., x-axis, y-axis, and z-axis) of each marker 86, 88, 90, and 92 of the welding helmet 30. Furthermore, the detection system 12 may determine both a position and an orientation of the welding helmet 30. With the position and orientation of the welding helmet 30, the detection system 12 may determine the position and/or the orientation of the welding torch 26 (e.g., as described above with respect to FIGS. 2-4) relative to the welding helmet 30. In addition, the detection system 12 may track the movement of the welding helmet 30 during a welding operation. Data from the detection system 12 may be displayed within the welding helmet 30. For example, data may be incorporated within a heads-up display of the helmet 30. The position of the helmet 30 may be associated with the position of the welding workpiece 28 and the welding torch 26. Images corresponding to the association may also be displayed. In certain embodiments a type of safety glasses may incorporate a camera and/or a display for capturing and/or displaying image data.

Figures 7, 8, 9:
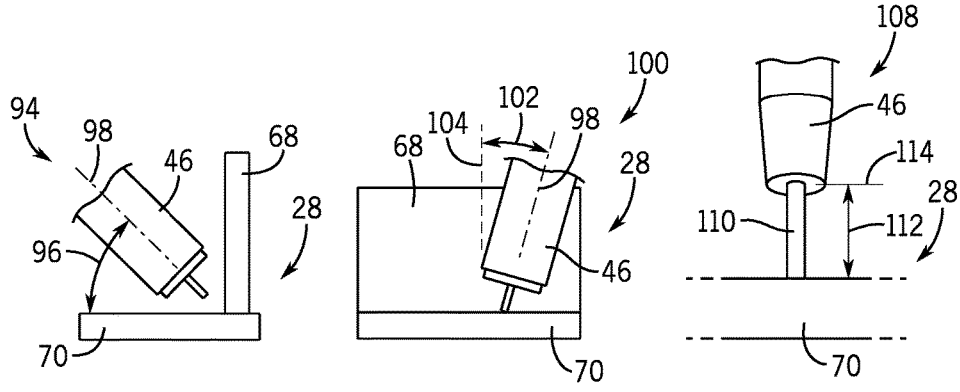
FIG. 7 is an illustration of a work angle of a welding operation in accordance with aspects of the present disclosure.
FIG. 8 is an illustration of a travel angle of a welding operation in accordance with aspects of the present disclosure.
FIG. 9 is an illustration of a contact tip-to-work distance of a welding operation in accordance with aspects of the present disclosure.

By detecting the position and the orientation of the welding torch 26 relative to the workpiece 28, a work angle (e.g., roll), a travel angle (e.g., pitch), a contact tip-to-work distance (CTWD), and/or a travel speed of the welding torch 26 may be determined. For example, FIG. 7 is an illustration of a work angle 94 of a welding operation. As illustrated, the work angle 94 is an angle 96 between the horizontal portion 70 of the workpiece 28 and a central axis 98 (e.g., this may be similar to the axis 54 described above) of the welding torch 26 as viewed from the side of the workpiece 28. As another example, FIG. 8 is an illustration of a travel angle 100 of a welding operation. The travel angle 100 is an angle 102 between the central axis 98 of the welding torch 26 and a vertical axis 104 of the vertical portion 68 of the workpiece 28. As illustrated, the vertical axis 104 extends parallel to the vertical portion 68 of the workpiece 28. Furthermore, the travel angle 100 is determined relative to a front view of the workpiece 28. As a further example, FIG. 9 is an illustration of a CTWD 108 of a welding operation. As illustrated, a welding electrode or welding wire 110 extends from the nozzle 46 of the welding torch 26. The CTWD 108 is a distance 112 between an upper surface of the horizontal portion 70 and a position 114 of the tip of the nozzle 46 of the welding torch 26.

As may be appreciated, welding data (e.g., the work angle, the travel angle, the CTWD, and/or the travel speed, among other data) may be provided by the welding training system 10 of FIG. 1 to a welding operator, instructor, and/or a supervisor during a welding operation (e.g., real or simulated). Furthermore, such welding data may be provided to the welding operator, instructor, and/or the supervisor after completion of the welding operation. In certain embodiments, the welding data may be provided on the display 22 of the detection system 12 in any suitable format (e.g., a welding score, charts, graphs, etc.) and/or to the audio device 24 of the detection system 12. Furthermore, a video playback of the welding operation (e.g., a three-dimensional rendering of the welding torch 26 as it moves along the workpiece 28, a virtual arc, a bead, and so forth) may be displayed on the display 22 of the detection system 12. In other embodiments, the welding operator may view welding data and/or three-dimensional rendering via a heads up display (e.g., in the welding helmet 30) or via virtual reality glasses. Accordingly, the welding operator may receive visual and/or audio clues to help them improve their welding technique. In certain embodiments, welding data may be provided (e.g., via a network) from multiple welding training systems 10 to a central location where the welding data from multiple welding training systems 10 may be compared (e.g., to compare performance of different welding operators).

In some embodiments, welding data output from the detection system 12 may provide the welding operator with a welding score. Furthermore, the welding data may be used as part of a welding game (e.g., a welding game software program executed by the processing device 20 of the detection system 12 and displayed on the display 22 of the detection system 12). For example, the welding data may be used to provide the welding operator with points that accumulate with each properly performed weld. In some embodiments, a simulated welding technique of the welding operator may be applied to a real world welding application. For example, the simulated welding technique might be applied to a chassis of a virtual racecar. After one or more simulated welds have been completed, the virtual racecar may be driven in a simulated race (e.g., on a racetrack) to see how the structure of the racecar handles environmental stresses (e.g., to test the structural integrity of the simulated welds). In certain embodiments, the virtual racecar may be controlled by the welding operator, or the virtual racecar may operate in an automated race that the welding operator may observe. Furthermore, the virtual racecar may compete against other virtual racecars (e.g., via a network) that have simulated welds performed by other welding operators to see how the virtual cars perform against each other.

Figure 10A:
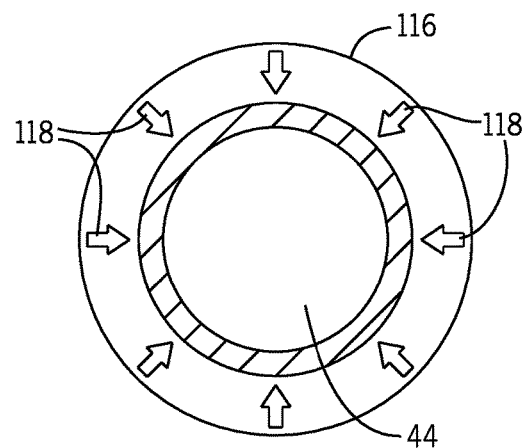
FIG. 10A is a top view of the welding guidance indicator of FIG. 10 in accordance with aspects of the present disclosure.
Figure 10:
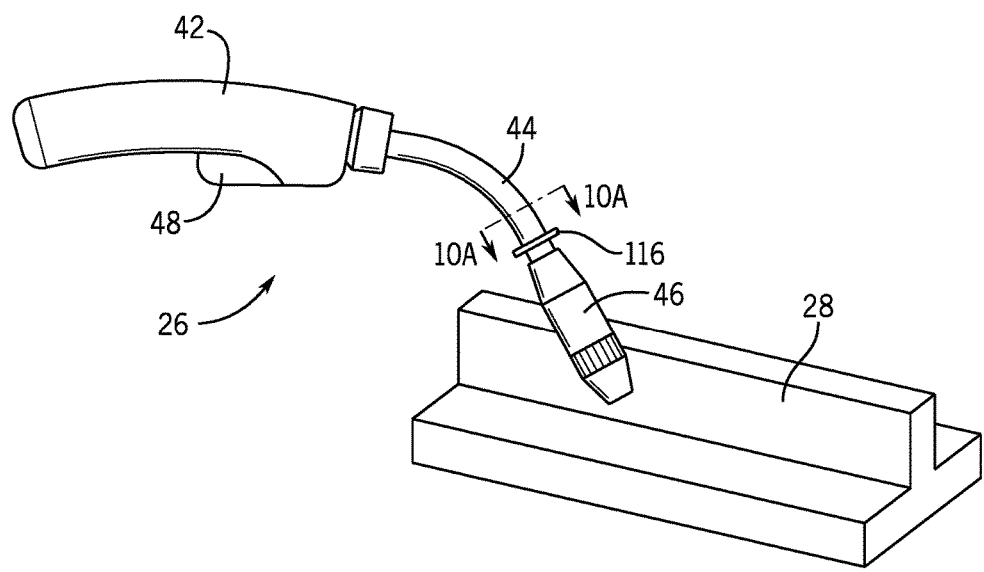
FIG. 10 is a perspective view of a welding torch having a welding guidance indicator in accordance with aspects of the present disclosure.

In addition, in certain embodiments, the welding torch 26 may include built-in indicators to provide guidance to a welding operator. For example, FIG. 10 is a perspective view of the welding torch 26 having a welding guidance indicator 116 (e.g., display) to provide torch angle guidance (e.g., work angle guidance, travel angle guidance) and/or travel speed guidance. Furthermore, FIG. 10A is a top view of the welding guidance indicator 116 of FIG. 10. As illustrated, the welding guidance indicator 116 may include multiple outputs 118 (e.g., arrows) that may act as guides for the welding operator. For example, one or more of the outputs 118 may illuminate to direct the welding operator to change the torch angle. In certain embodiments, when none (or all) of the outputs 118 are illuminated, the welding operator may be holding the welding torch 26 at a proper torch angle. As may be appreciated, the outputs 118 may flash at various speeds to indicate to the welding operator to increase and/or slow down travel speed.

Figure 11:
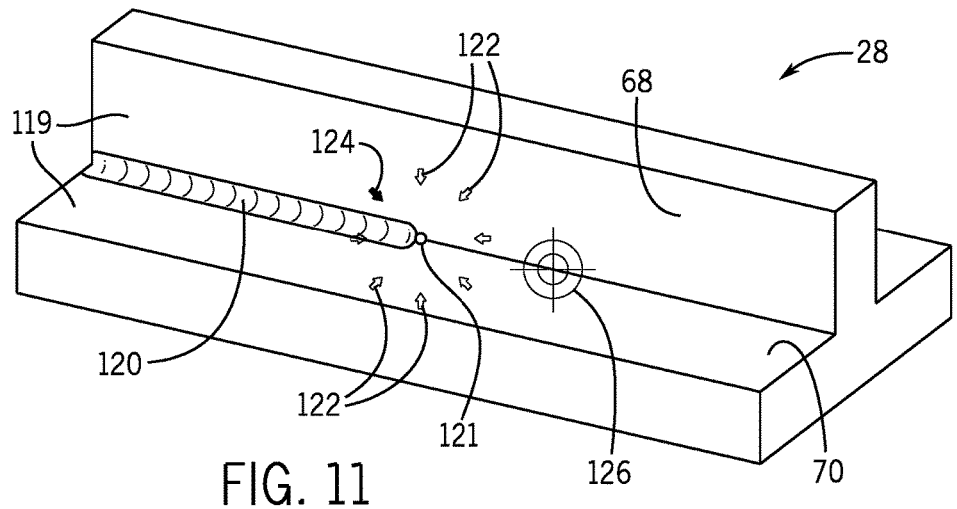
FIG. 11 is a perspective view of an embodiment of a workpiece having a display to provide guidance to a welding operator in accordance with aspects of the present disclosure.

Furthermore, in certain embodiments, the workpiece 28 may include a display to provide guidance to a welding operator. Accordingly, FIG. 11 is a perspective view of an embodiment of the workpiece 28 having a display 119. As illustrated, the display 119 may extend on surfaces of both the vertical portion 68 and the horizontal portion 70. As a welding operator performs a virtual welding operation, a virtual weld bead 120 may be shown on the display 119. Furthermore, a virtual welding arc 121 may be displayed on the display 119. As illustrated, the display 119 may also include outputs 122 (e.g., arrows) that may direct the welding operator. For example, one or more of the outputs 122 may illuminate (e.g., output 124) to direct the welding operator to change their torch angle. In certain embodiments, when none (or all) of the outputs 122 are illuminated on the display 119, the welding operator may be holding the welding torch 26 at a proper torch angle. As may be appreciated, in some embodiments, the outputs 122 may flash at various speeds on the display 119 to indicate to the welding operator to increase and/or slow down travel speed. Furthermore, a target position 126 (e.g., crosshairs target) may be displayed on the display 119 to illustrate where the virtual weld bead 120 should be if the travel speed of the welding torch 26 were correct.

Figure 12:
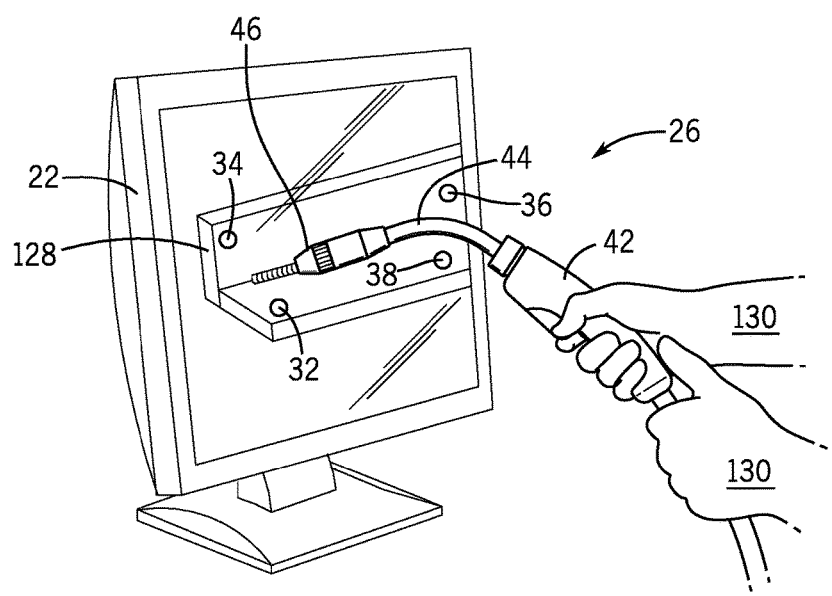
FIG. 12 is a perspective view of an embodiment of a virtual workpiece in accordance with aspects of the present disclosure.

In certain embodiments, the workpiece 28 may be a virtual workpiece and may therefore be incorporated into the display 22 of the detection system 12. Accordingly, FIG. 12 is a perspective view of an embodiment of a virtual workpiece 128 shown on the display 22 of the detection system 12. In certain embodiments, the virtual workpiece 128 may include markers 32, 34, 36, and 38 (e.g., virtual markers) configured to be detected by the motion detecting device 14. As illustrated, a welding operator 130 may hold the welding torch 26 up to the display 22 to perform a virtual weld on the virtual workpiece 128. As may be appreciated, the display 22 may be any suitable display. For example, the display 22 may be a liquid crystal display (LCD) screen, a tablet computer, computer monitor, television, touchscreen, and so forth. Furthermore, the virtual workpiece 128 may be configured with markers (e.g., such as the markers described in detail above) to be detected by the detection system 12. In such an embodiment, the detection system 12 may be synchronized with the display 22 to minimize flicker. In some embodiments, a holographic projection may be used to display the virtual workpiece 128, a virtual welding bead, and/or a virtual welding arc, among other things. In addition, the virtual workpiece 128 may include virtual guides to direct a welding operator to change their torch angle and/or travel speed. Certain embodiments may also display a virtual representation of the welding torch 26. In such embodiments, the virtual weld may be performed a suitable distance away from the display 22, such as by using a welding workpiece 28.

Figure 13:
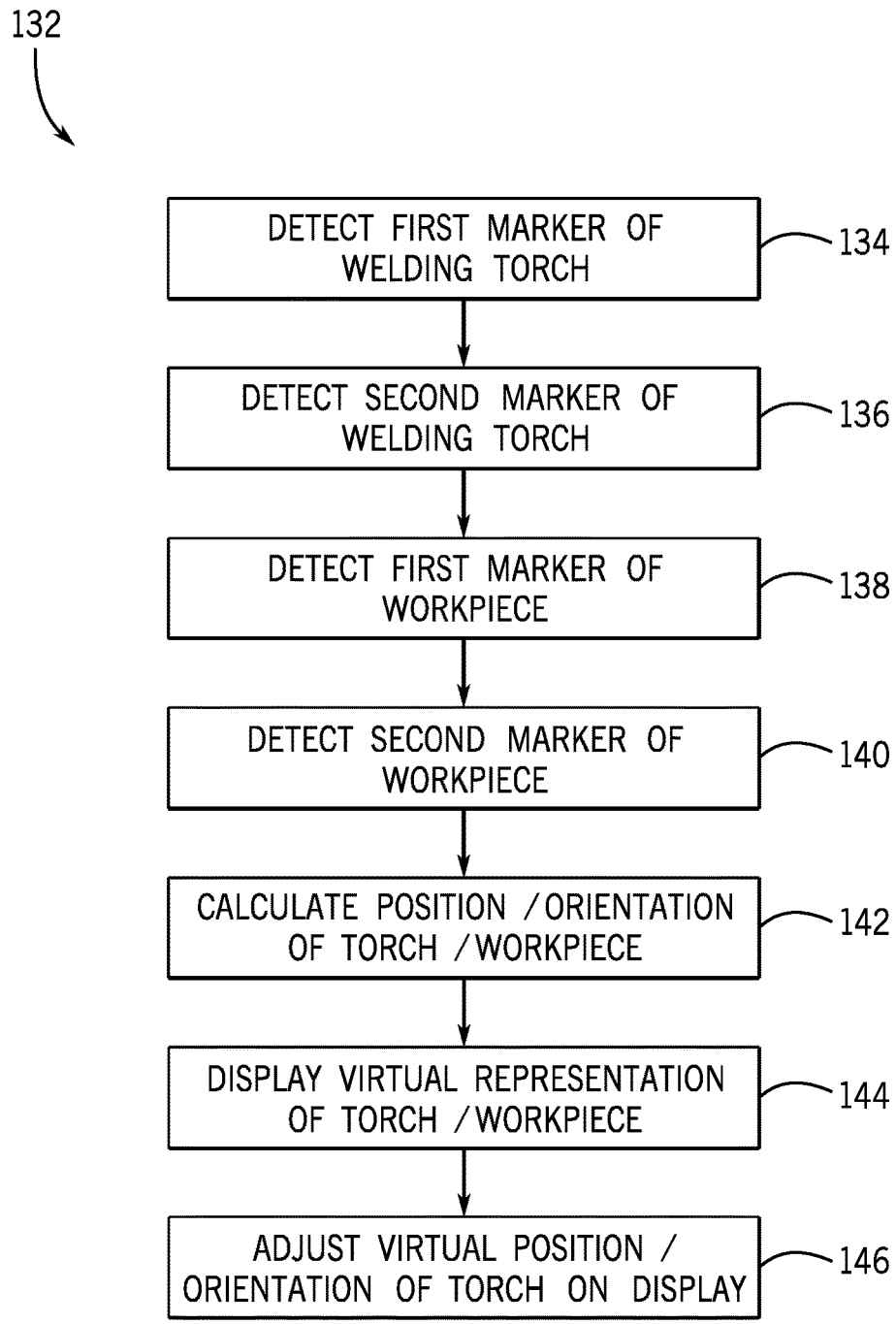
FIG. 13 is an embodiment of a method for determining a position and an orientation of a welding torch and a workpiece in accordance with aspects of the present disclosure.

FIG. 13 is an embodiment of a method 132 for determining a position and an orientation of the welding torch 26 and the workpiece 28. A first marker of the welding torch 26 may be detected using the motion detecting device 14 of the detection system 12 (block 134). Furthermore, a second marker of the welding torch 26 may be detected using the motion detecting device 14 (block 136). Likewise, a first marker of the workpiece 28 may be detected using the motion detecting device 14 (block 138) and a second marker of the workpiece 28 may be detected using the motion detecting device 14 (block 140). As may be appreciated, detecting a first or second marker using the motion detecting device 14 may include detecting a size, shape, and/or color of the marker. The position and the orientation (e.g., pitch, roll, etc.) of the welding torch 26 and the workpiece 28 may be calculated using the first and second markers of the welding torch 26 and the first and second markers of the workpiece 28 (e.g., via the detection system 12) (block 142). For example, a relative position and a relative orientation of the welding torch 26 may be calculated in relation to the workpiece 28. Furthermore, a virtual representation of the welding torch 26 and/or the workpiece 28 may be shown on the display 22 of the detection system 12 (block 144). In addition, a virtual position and/or a virtual orientation of the welding torch 26 on the display 22 may be adjusted as the position and the orientation of the welding torch 44 changes (block 146). As may be appreciated, the display 22 may also include virtual guides (e.g., a target value, a range of values, etc.) to direct the welding operator to a proper torch angle (e.g., pitch, roll, etc.) and/or a proper travel speed.

As may be appreciated, using the systems, devices, and techniques described herein, a low cost welding training system 10 may be provided for training welding operators. The welding training system 10 may allow a greater number of welding operators to be trained and may provide the welding operators with a greater amount of time to use the welding training system 10 (e.g., due to its low cost). Furthermore, as described above, a gaming aspect of welding training may be provided to welding operators to enhance welding operator interest in the welding training system 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
  a plurality of markers configured to be coupled to a welding device; and
  a position detecting system configured to:
    detect the plurality of markers;
    determine, based on detection of the plurality of markers, at least one of a position of the welding device or an orientation of the welding device;
    detect, based on detection of the plurality of markers, a workpiece within a field of view of the position detecting system; and
    produce a map corresponding to the welding device and the workpiece.

2. The system of claim 1, comprising a processing device configured to determine at least one of a pitch of the welding device, a roll of the welding device, a yaw of the welding device, based at least partly on data received from the position detecting system.

3. The system of claim 1, comprising a processing device configured to determine a travel speed of the welding device based at least partly on data received from the position detecting system.

4. The system of claim 1, wherein the welding device comprises a welding torch having the plurality of markers coupled thereon.

5. The system of claim 1, wherein the position detecting system comprises a commercially available off-the-shelf component of a video game system.

6. The system of claim 1, wherein the position detecting system comprises a commercially available off-the-shelf computer accessory.

7. The system of claim 1, wherein the welding device comprises a welding workpiece having the plurality of markers coupled thereon.

8. The system of claim 1, comprising a virtual workpiece configured to display a simulated weld on the virtual workpiece.

9. The system of claim 1, wherein the position detecting system is configured to detect the plurality of markers of the welding torch by detecting at least one of respective sizes of the plurality of markers, respective shapes of the plurality of markers, or colors of the plurality of markers.

10. A method comprising:
  detecting a first marker of a welding torch using a position detecting system;
  detecting a second marker of the welding torch using the position detecting system;
  detecting, based on a position of the first marker and a position of the second marker within a field of view of the position detecting system, a workpiece;
  calculating at least one of a position of the welding torch or an orientation of the welding torch, using the detected first and second markers; and
  producing a map corresponding to the welding torch and the workpiece.

11. The method of claim 10, wherein detecting the first marker of the welding torch using the position detecting system comprises detecting at least one of a size of the first marker, a shape of the first marker, or a color of the first marker.

12. The method of claim 11, wherein detecting the second marker of the welding torch using the position detecting system comprises detecting at least one of a size of the second marker, a shape of the second marker, or a color of the second marker.

13. The method of claim 10, wherein calculating at least one of the position of the welding torch, or the orientation of the welding torch, comprises at least one of calculating a pitch of the welding torch, a roll of the welding torch, or a yaw of the welding torch.

14. The method of claim 13, wherein calculating at least one of the pitch of the welding torch, the roll of the welding torch, or the yaw of the welding torch, comprises calculating at least one of the pitch, the roll, or the yaw, relative to a welding workpiece.

15. A method comprising:
  detecting a first marker of a welding torch using a position detecting system;
  detecting a second marker of the welding torch using the position detecting system;
  detecting a first marker of a welding workpiece using the position detecting system;
  detecting a second marker of the welding workpiece using the position detecting system;

detecting a plurality of objects within a field of view of the position detecting system;

calculating a position, an orientation, or some combination thereof, of the welding torch and the welding workpiece using the first and second markers of the welding torch and the first and second markers of the welding workpiece; and producing a map corresponding to the welding torch, the welding workpiece, and the plurality of objects.

16. The method of claim 15, comprising displaying a virtual representation of the welding workpiece on a display.

17. The method of claim 16, comprising displaying a virtual weld bead on the display, and adjusting a virtual position and a virtual orientation of the virtual weld bead on the display as the position, the orientation, or some combination thereof, of the welding torch changes.

18. The method of claim 15, wherein calculating the position, the orientation, or some combination thereof, of the welding torch and the welding workpiece comprises calculating a relative position, a relative orientation, or some combination thereof, of the welding torch in relation to the welding workpiece.

19. The method of claim 15, wherein the position detecting system comprises a camera and an infrared emitter.

* * * * *